(12) United States Patent (10) Patent No.: US 7,934,708 B2
Haller (45) Date of Patent: May 3, 2011

(54) AIR SPRING FOR A VEHICLE SEAT, AND VEHICLE SEAT COMPRISING SUCH AN AIR SPRING

(75) Inventor: Erwin Haller, Birgland (DE)

(73) Assignee: Grammer AG, Amberg (DE)

( * ) Notice: Subject to any disclaimer, the term of this patent is extended or adjusted under 35 U.S.C. 154(b) by 725 days.

(21) Appl. No.: 11/959,245

(22) Filed: Dec. 18, 2007

(65) Prior Publication Data

US 2008/0150202 A1  Jun. 26, 2008

(51) Int. Cl.
*A47C 7/14* (2006.01)

(52) U.S. Cl. ...................................................... 267/131

(58) Field of Classification Search .................. 267/131, 267/122, 34.11, 67.19, 64.27, 64.28
See application file for complete search history.

(56) References Cited

U.S. PATENT DOCUMENTS

| | | |
|---|---|---|
| 2,973,968 A | 3/1961 | Behles |
| 3,042,392 A | 7/1962 | Schmitz et al. |
| 3,466,055 A | 9/1969 | Keijzer |
| 3,552,763 A | 1/1971 | Yasin |
| 3,762,769 A | 10/1973 | Poschl |
| 3,938,770 A * | 2/1976 | Turner et al. .................. 248/550 |
| 3,966,223 A | 6/1976 | Carr |
| 4,052,088 A | 10/1977 | Nicholls |
| 4,159,105 A | 6/1979 | Vander Laan et al. |
| 4,193,629 A | 3/1980 | Merkle |
| 4,286,765 A | 9/1981 | Delgleize et al. |
| 4,418,955 A | 12/1983 | Muncke et al. |
| 4,451,079 A | 5/1984 | Takahashi |
| 4,463,839 A | 8/1984 | Ashiba |
| 4,469,010 A * | 9/1984 | Skover et al. ................... 91/408 |
| 4,600,215 A | 7/1986 | Kuroki et al. |
| 4,634,142 A | 1/1987 | Woods et al. |
| 4,645,042 A | 2/1987 | Inoue et al. |
| 4,645,169 A | 2/1987 | Mischer |
| 4,684,100 A | 8/1987 | Grassl |
| 4,700,971 A | 10/1987 | Doi et al. |
| 4,726,604 A | 2/1988 | Asami et al. |
| 4,729,539 A | 3/1988 | Nagata |
| 4,729,580 A | 3/1988 | Buma et al. |
| 4,733,847 A | 3/1988 | Grassl |
| 4,822,094 A | 4/1989 | Oldfather et al. |
| 4,852,863 A | 8/1989 | Breitenbacher et al. |
| 4,946,145 A | 8/1990 | Kurabe |
| 5,058,852 A | 10/1991 | Meier et al. |
| 5,125,631 A | 6/1992 | Brodersen et al. |
| 5,133,575 A | 7/1992 | Zantinge et al. |
| 5,169,129 A | 12/1992 | Hoffman |
| 5,176,355 A | 1/1993 | Carter |

(Continued)

FOREIGN PATENT DOCUMENTS

DE       220674       4/1985

(Continued)

*Primary Examiner* — Melanie Torres Williams
(74) *Attorney, Agent, or Firm* — Black Lowe & Graham, PLLC

(57) ABSTRACT

An air spring for a vehicle seat. The air spring includes a plurality of air spring components which delimit at least one air spring chamber. The air spring forms an intake air connection and a discharged air connection for controlling the height and/or level of the vehicle seat, wherein the air spring furthermore has, for controlling the height and/or level of the vehicle seat, a valve device which is integrated in the air spring or in at least one air spring component.

9 Claims, 25 Drawing Sheets

U.S. PATENT DOCUMENTS

| | | | |
|---|---|---|---|
| 5,217,210 A | 6/1993 | Schützner | |
| 5,234,203 A * | 8/1993 | Smith | 267/131 |
| 5,255,935 A | 10/1993 | Imani | |
| 5,324,069 A | 6/1994 | Ogawa | |
| 5,413,316 A | 5/1995 | Easter | |
| 5,425,436 A | 6/1995 | Teramura et al. | |
| 5,428,533 A | 6/1995 | Ogawa | |
| 5,450,322 A | 9/1995 | Tanaka et al. | |
| 5,533,703 A | 7/1996 | Grassl et al. | |
| 5,536,059 A | 7/1996 | Amirouche | |
| 5,555,501 A | 9/1996 | Furihata et al. | |
| 5,558,398 A | 9/1996 | Santos | |
| 5,564,520 A * | 10/1996 | Forsythe | 180/282 |
| 5,603,387 A | 2/1997 | Beard et al. | |
| 5,623,410 A | 4/1997 | Furihata et al. | |
| 5,735,509 A | 4/1998 | Gryp et al. | |
| 5,941,920 A | 8/1999 | Schubert | |
| 6,000,703 A | 12/1999 | Schubert et al. | |
| 6,029,764 A | 2/2000 | Schubert | |
| 6,067,491 A | 5/2000 | Takahashi | |
| 6,078,791 A | 6/2000 | Tuttle et al. | |
| 6,082,715 A | 7/2000 | Vandermolen | |
| 6,314,353 B1 | 11/2001 | Ohsaku et al. | |
| 6,371,456 B1 | 4/2002 | Ritchie et al. | |
| 6,490,930 B1 | 12/2002 | Ohkubo et al. | |
| 6,616,116 B1 | 9/2003 | Rochau et al. | |
| 7,152,839 B2 | 12/2006 | Mullinix et al. | |
| 7,712,836 B2 | 5/2010 | Deml | |
| 2001/0044685 A1 | 11/2001 | Schubert | |
| 2003/0015830 A1 | 1/2003 | Miller et al. | |
| 2003/0140487 A1 | 7/2003 | Plettner | |
| 2004/0094912 A1 | 5/2004 | Niwa et al. | |
| 2006/0185434 A1 | 8/2006 | Bernhagen | |
| 2007/0236071 A1 | 10/2007 | Fujita et al. | |
| 2008/0156602 A1 | 7/2008 | Hiemenz et al. | |
| 2008/0197684 A1 | 8/2008 | Ott et al. | |
| 2009/0134595 A1 | 5/2009 | Haller et al. | |
| 2009/0272871 A1 | 11/2009 | Haller | |
| 2010/0102493 A1 | 4/2010 | Deml et al. | |
| 2010/0117428 A1 | 5/2010 | Deml et al. | |

FOREIGN PATENT DOCUMENTS

| | | |
|---|---|---|
| DE | 223835 | 6/1985 |
| DE | 3517503 | 11/1986 |
| DE | 3517503 A1 | 11/1986 |
| DE | 3517504 A1 | 11/1986 |
| DE | 3517505 A1 | 11/1986 |
| DE | 4025183 | 11/1991 |
| DE | 4025183 C1 | 11/1991 |
| DE | 4211628 | 10/1993 |
| DE | 4335199 | 5/1995 |
| DE | 19803750 A1 | 8/1998 |
| DE | 19714576 | 10/1998 |
| DE | 19902224 | 4/2000 |
| DE | 19848821 | 5/2000 |
| DE | 20214583 | 1/2003 |
| DE | 10317134 | 6/2004 |
| DE | 10330198 | 2/2005 |
| DE | 102004054325 | 4/2006 |
| DE | 102005023090 | 11/2006 |
| DE | 102005043575 | 3/2007 |
| DE | 102005044214 | 3/2007 |
| EP | 0089794 | 9/1983 |
| EP | 0563948 | 4/1993 |
| EP | 0938999 A2 | 9/1999 |
| EP | 1050749 | 11/2000 |
| EP | 1188608 | 3/2002 |
| EP | 1352595 | 10/2003 |
| EP | 1464866 | 10/2004 |
| EP | 1484205 | 12/2004 |
| EP | 1657471 | 5/2006 |
| EP | 1693655 | 8/2006 |
| EP | 1844979 | 10/2007 |
| FR | 2879740 | 6/2006 |
| JP | 61075008 | 4/1986 |
| JP | 2133215 | 5/1990 |
| JP | 2197470 | 8/1990 |
| JP | 3200485 | 9/1991 |
| JP | 2004058695 | 2/2004 |
| JP | 2004185476 | 7/2004 |
| KR | 20020090377 | 12/2002 |
| WO | 8703256 | 6/1987 |
| WO | 8809270 | 12/1988 |
| WO | 8912766 | 12/1989 |
| WO | 0035708 | 6/2000 |
| WO | 0043952 | 7/2000 |
| WO | 0058125 | 10/2000 |
| WO | 02068229 | 9/2002 |
| WO | 2004057528 | 7/2004 |
| WO | 2005008578 | 1/2005 |
| WO | 2005022690 | 3/2005 |
| WO | 2005095153 | 10/2005 |
| WO | 2005102112 | 11/2005 |

\* cited by examiner

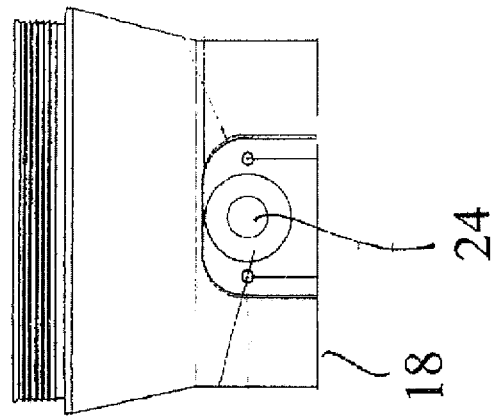
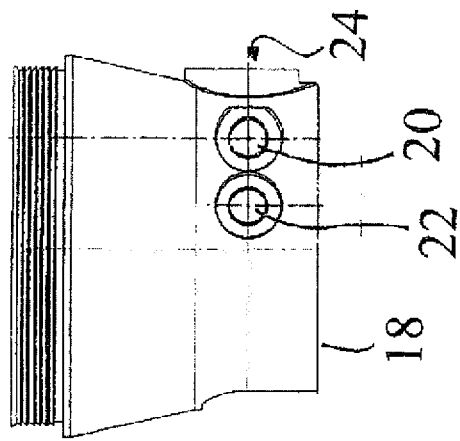
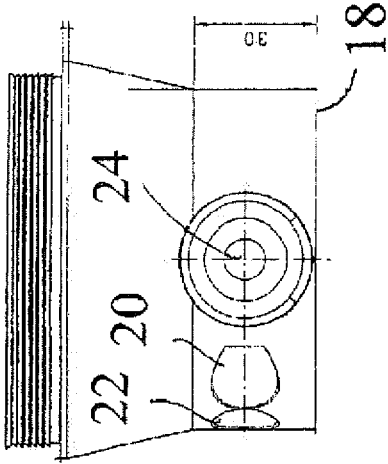
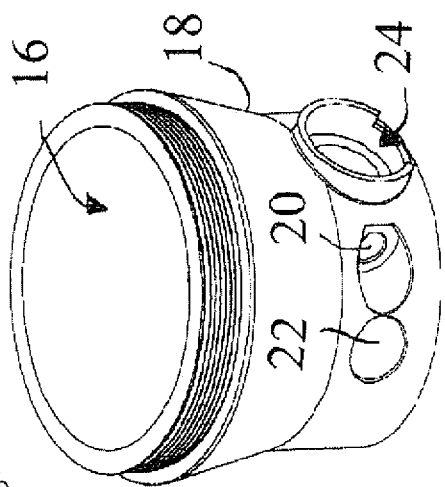

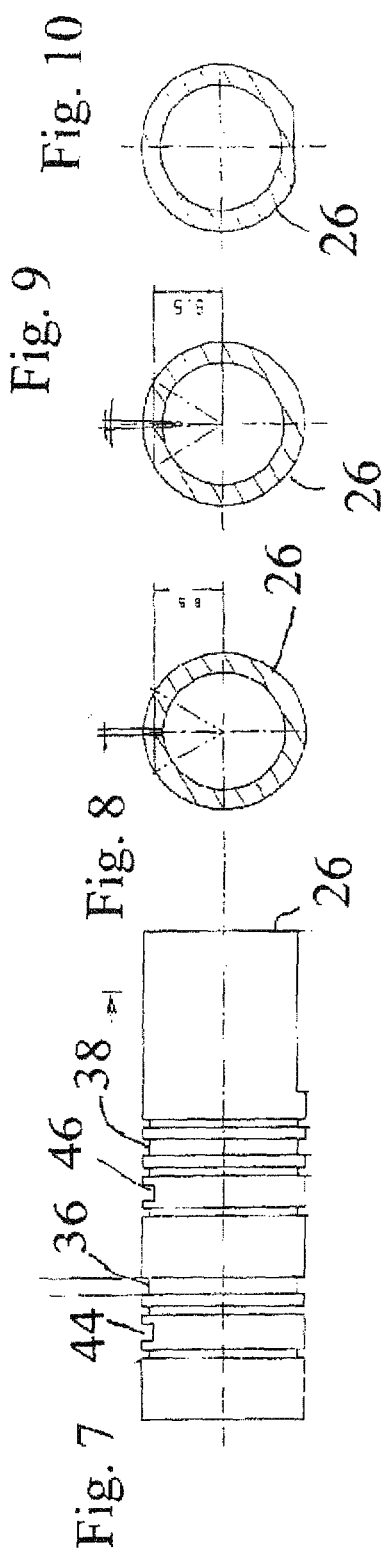
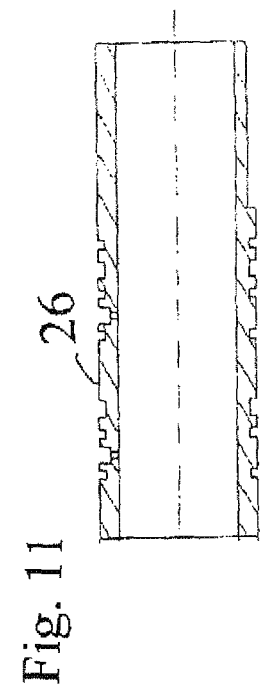
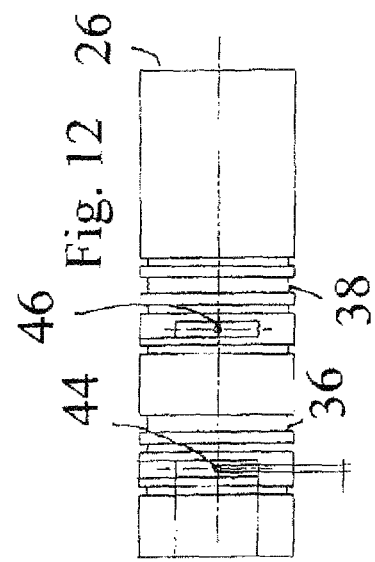

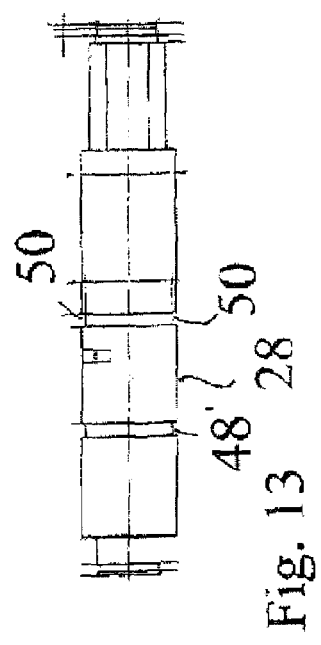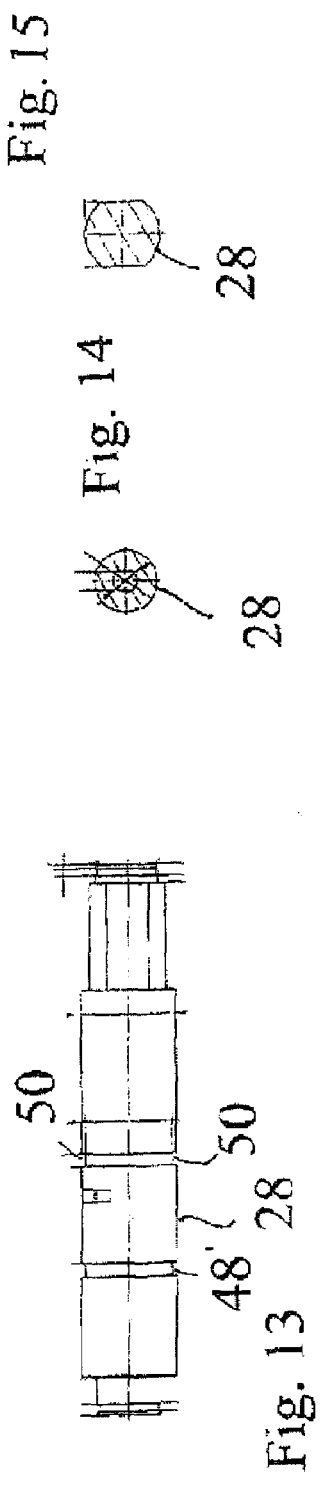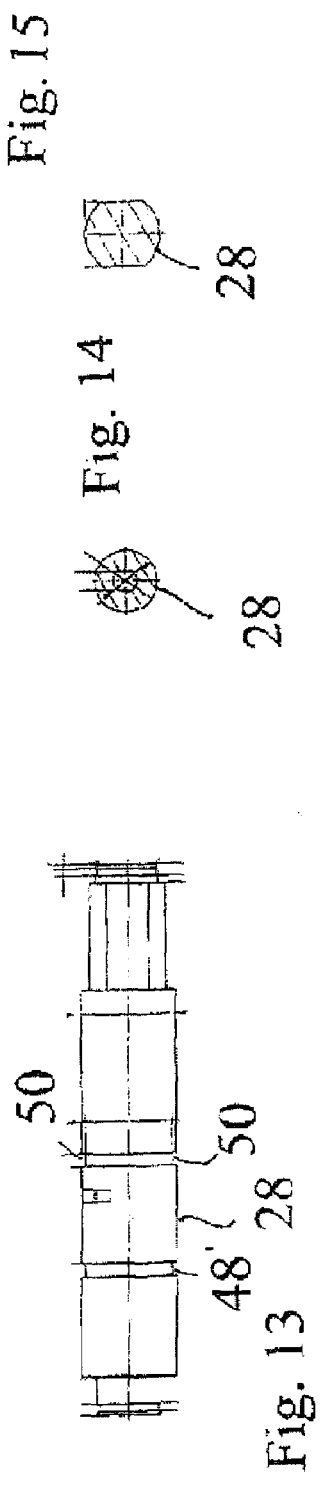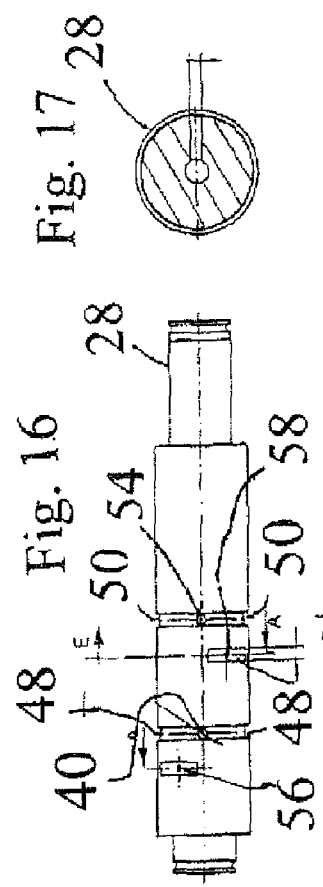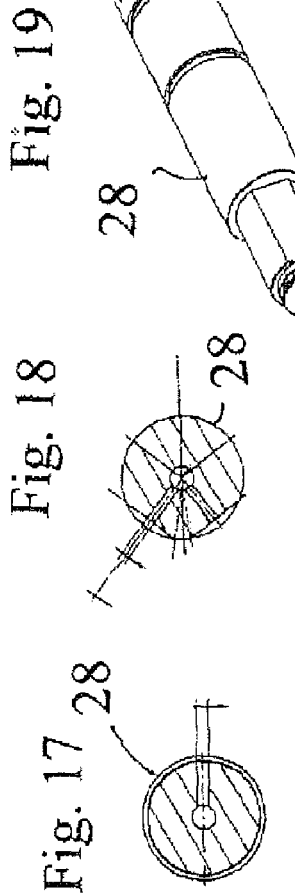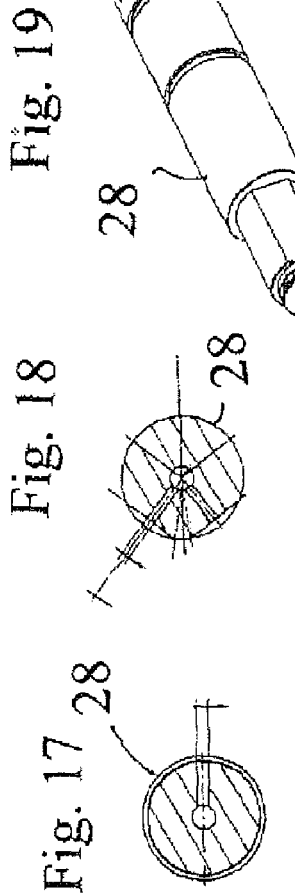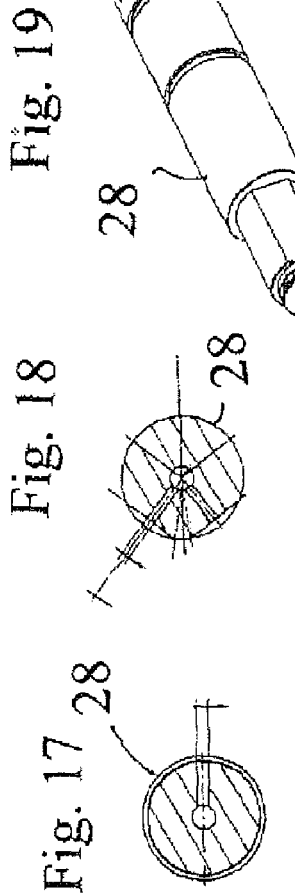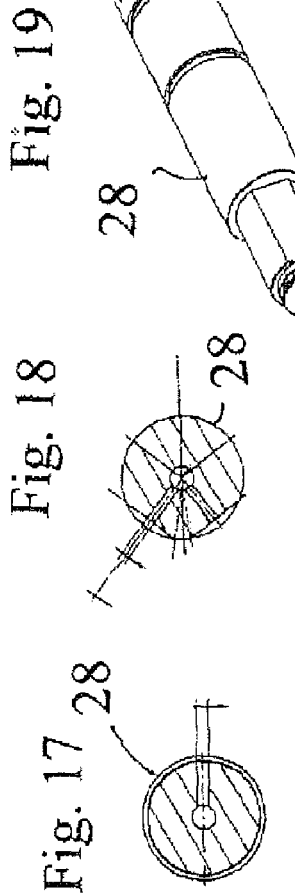

Fig. 33
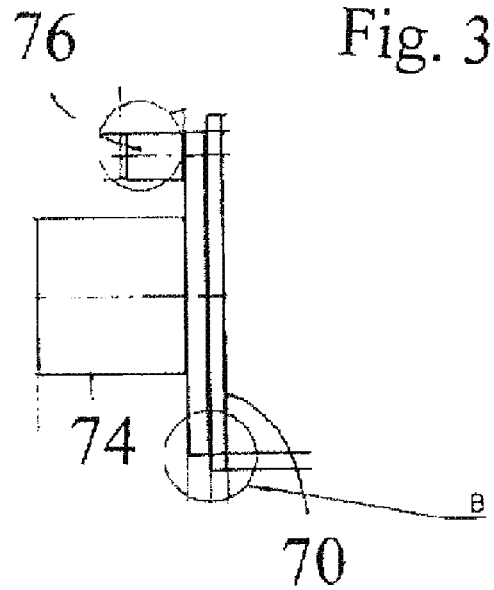
Fig. 34
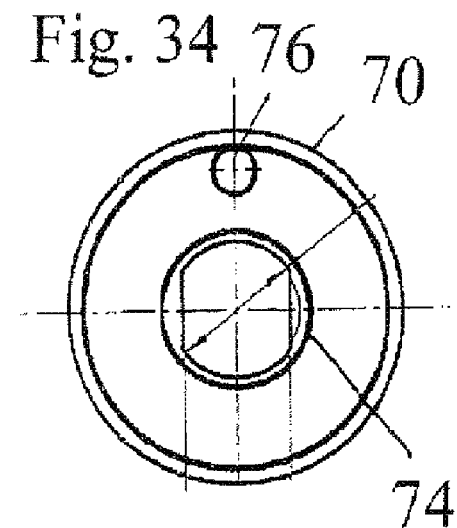
Fig. 35
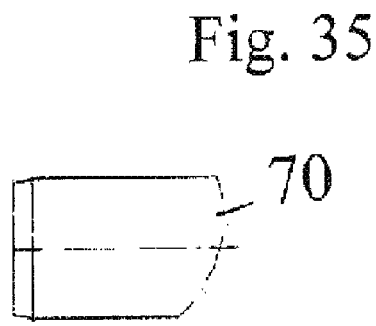
Fig. 36
Fig. 37
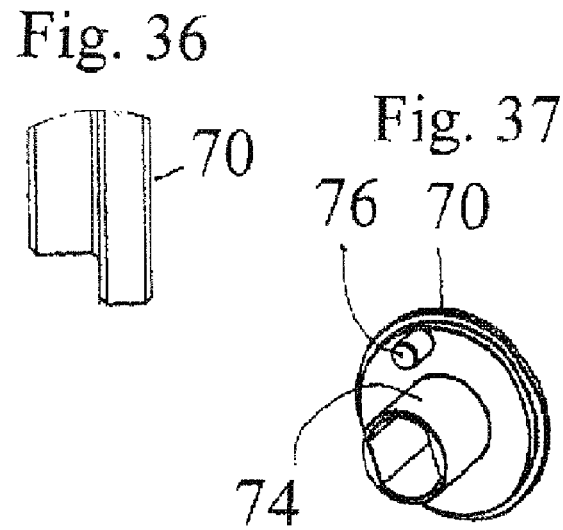

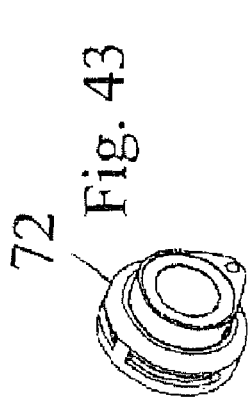
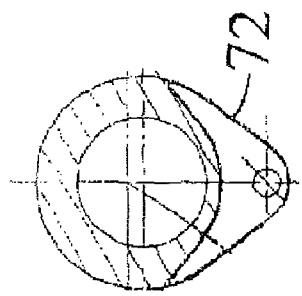
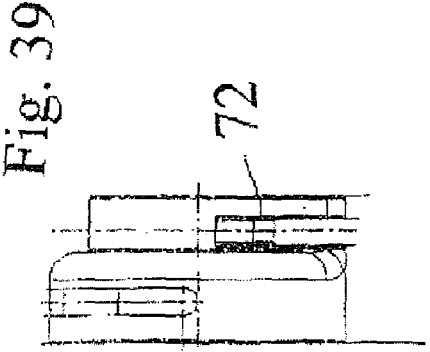
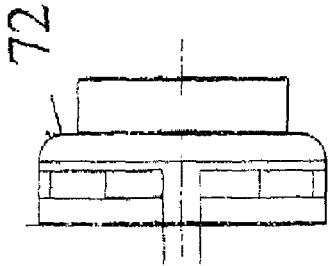
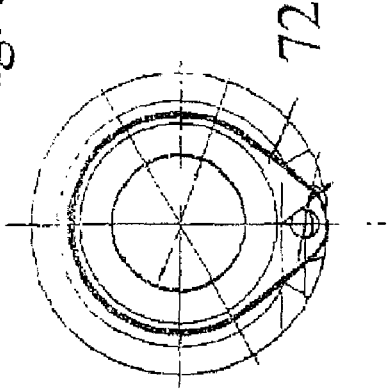
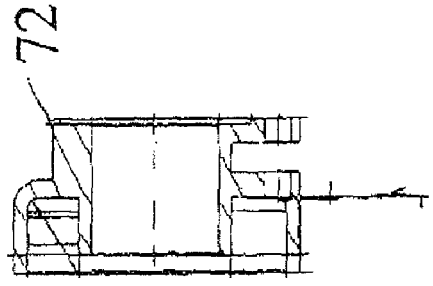

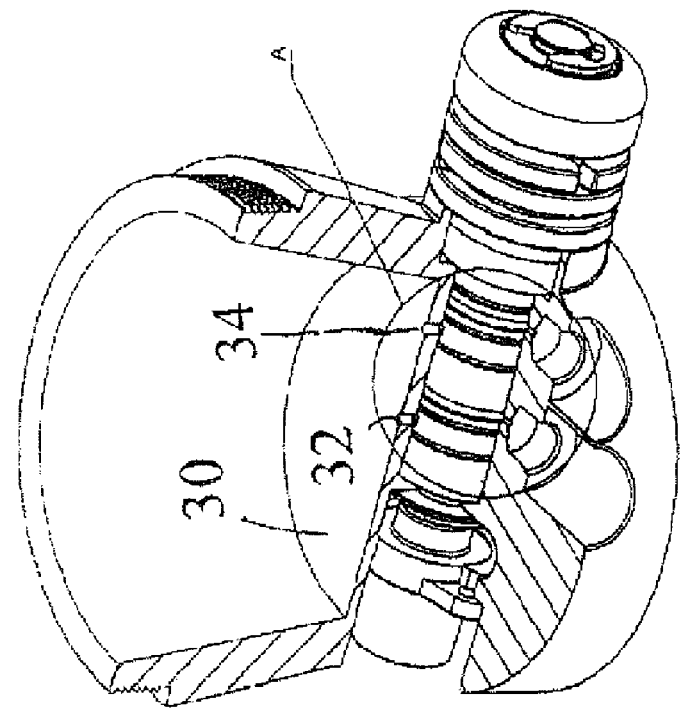
Fig. 50
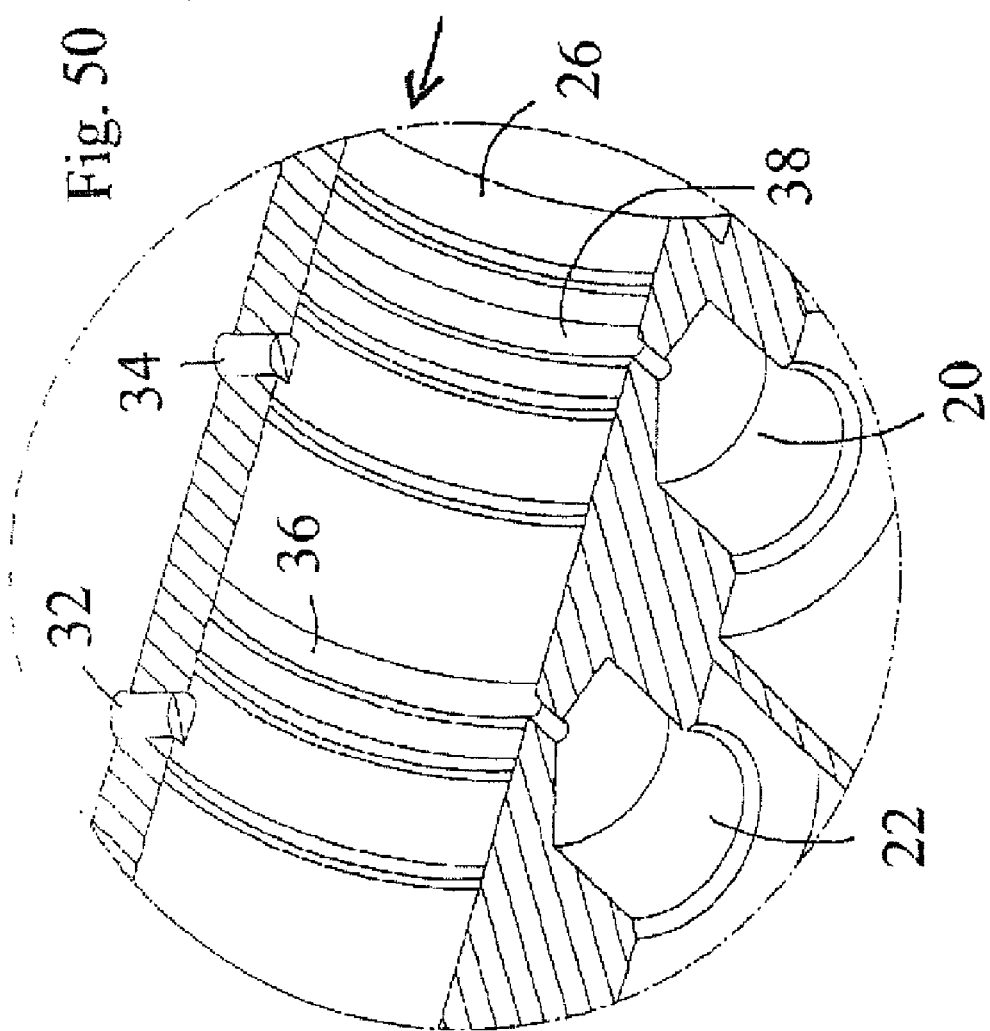

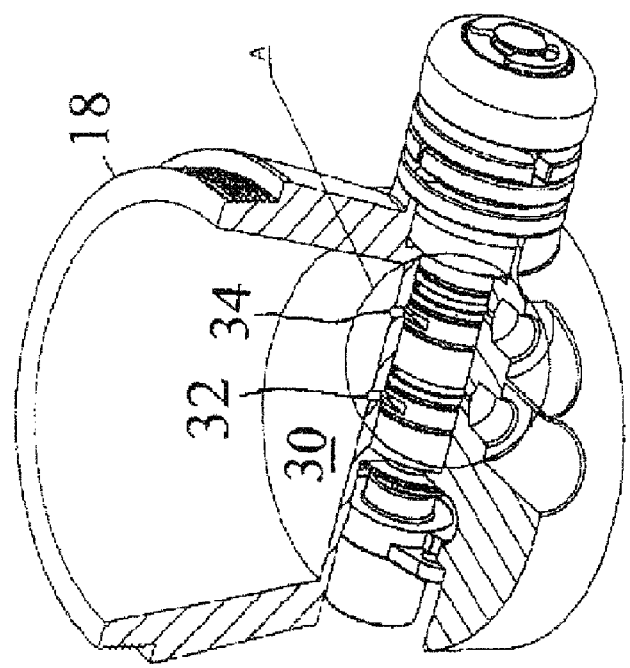
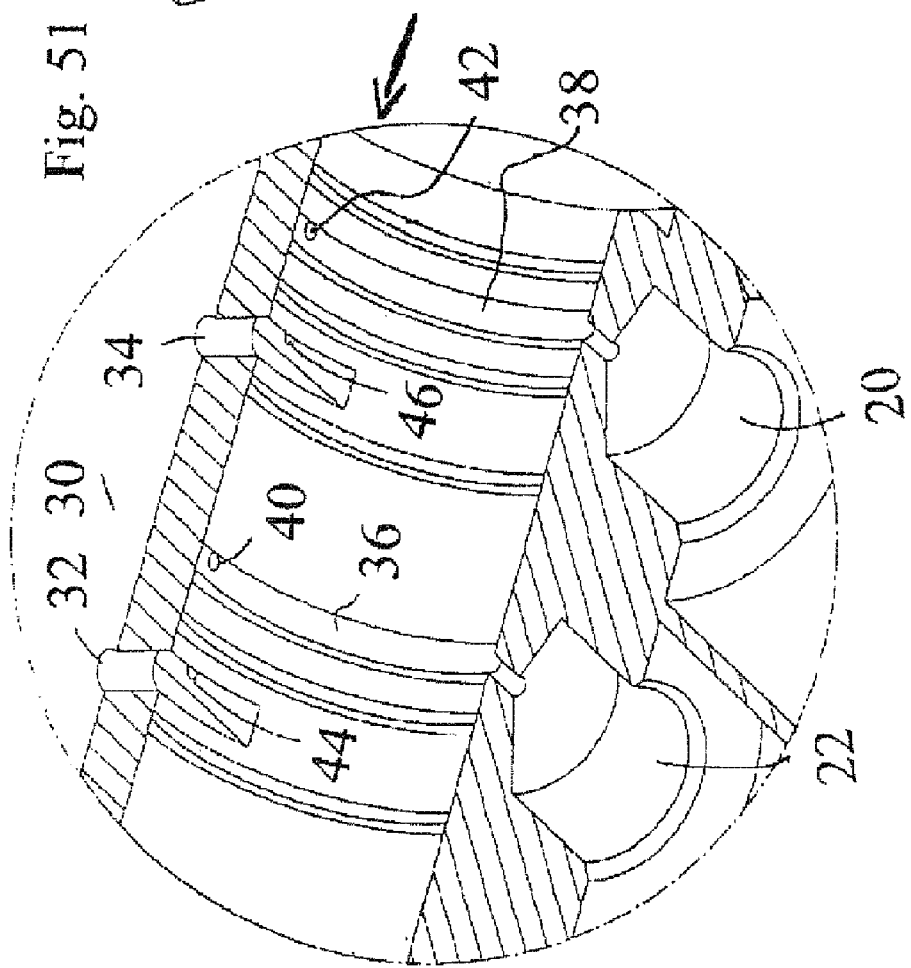
Fig. 51

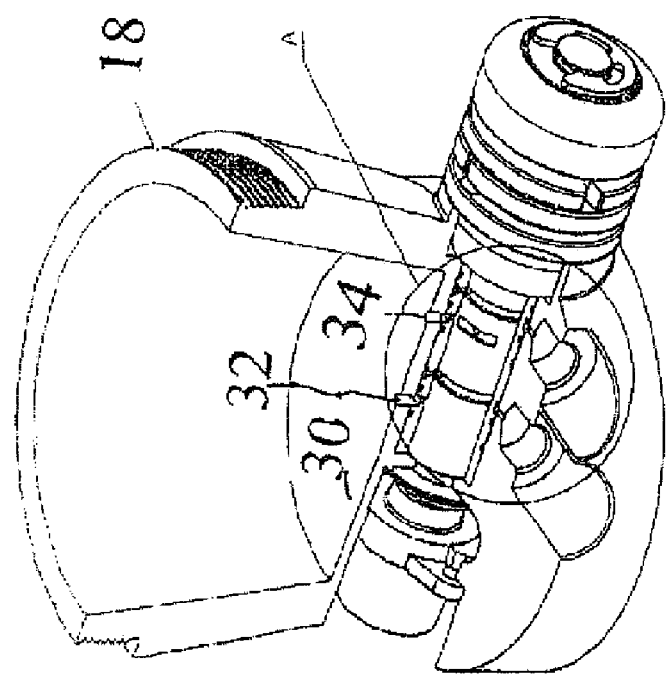
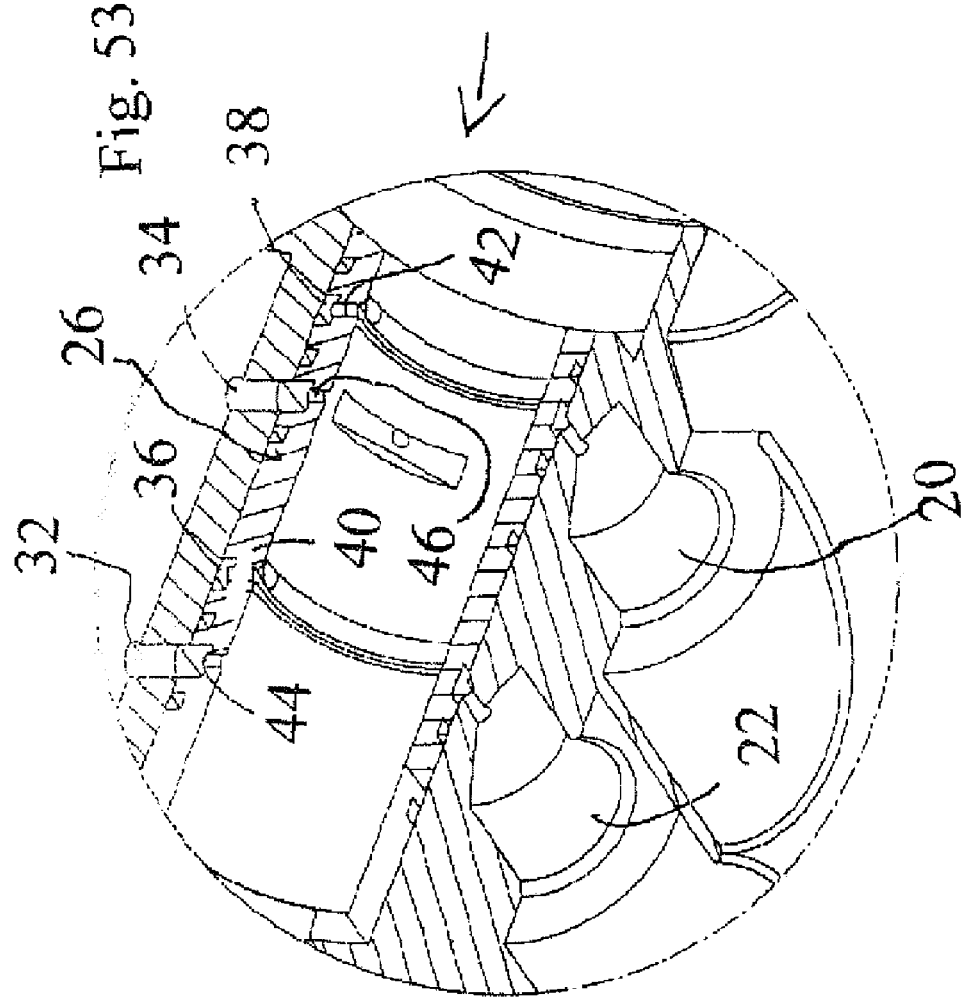
Fig. 53

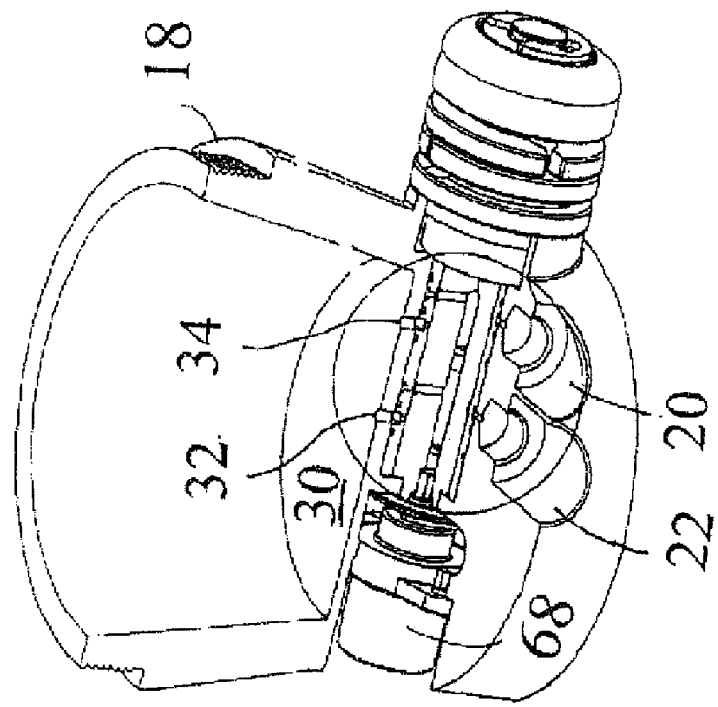
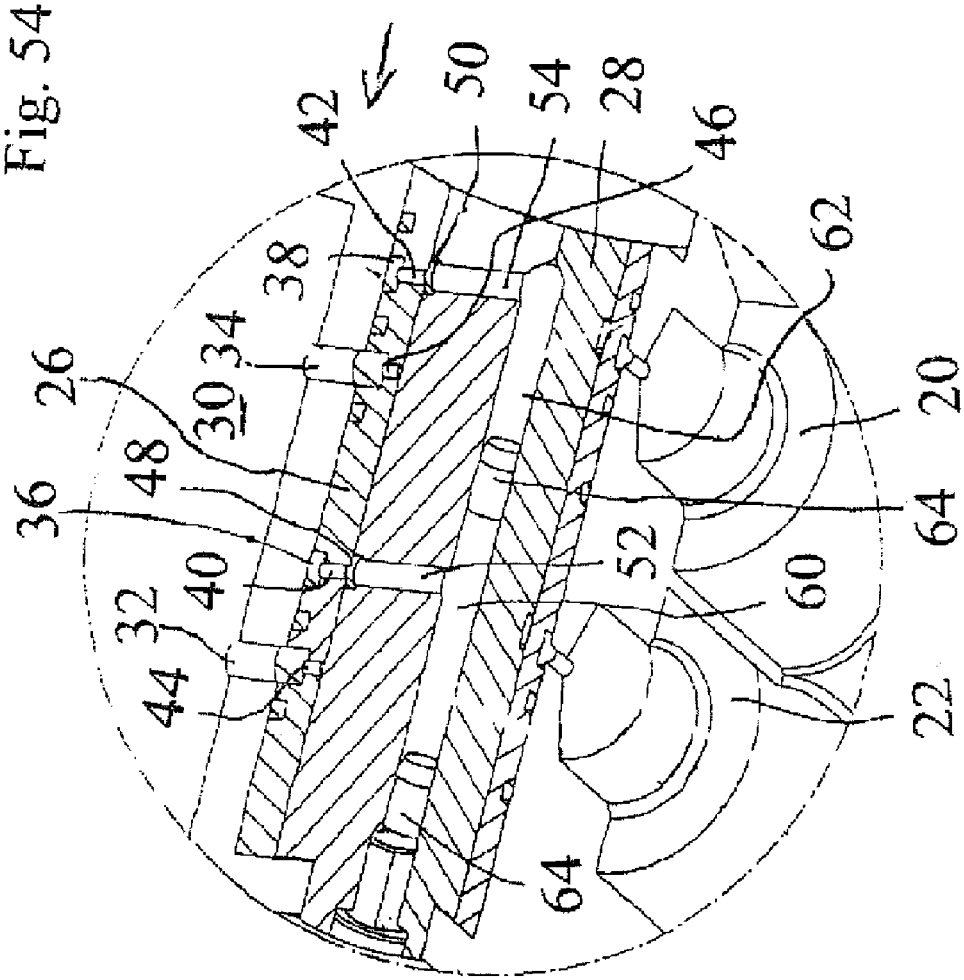
Fig. 54

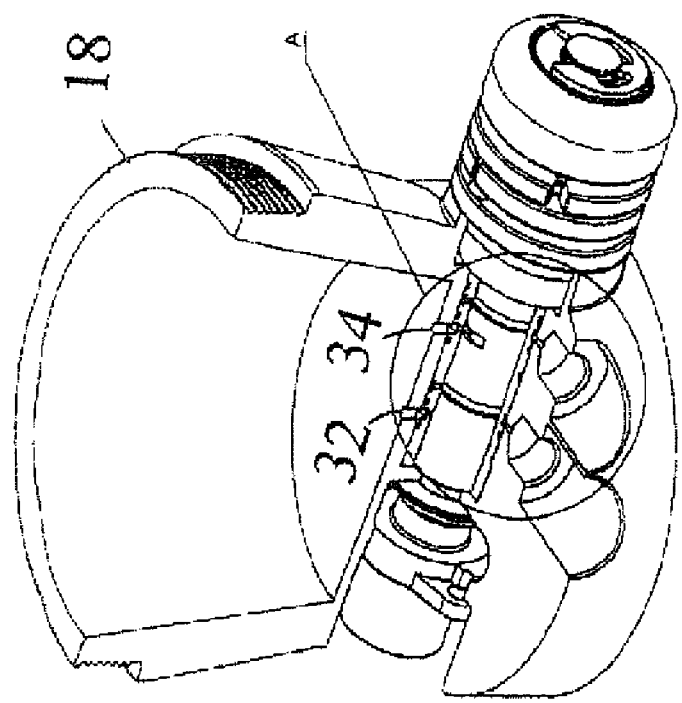
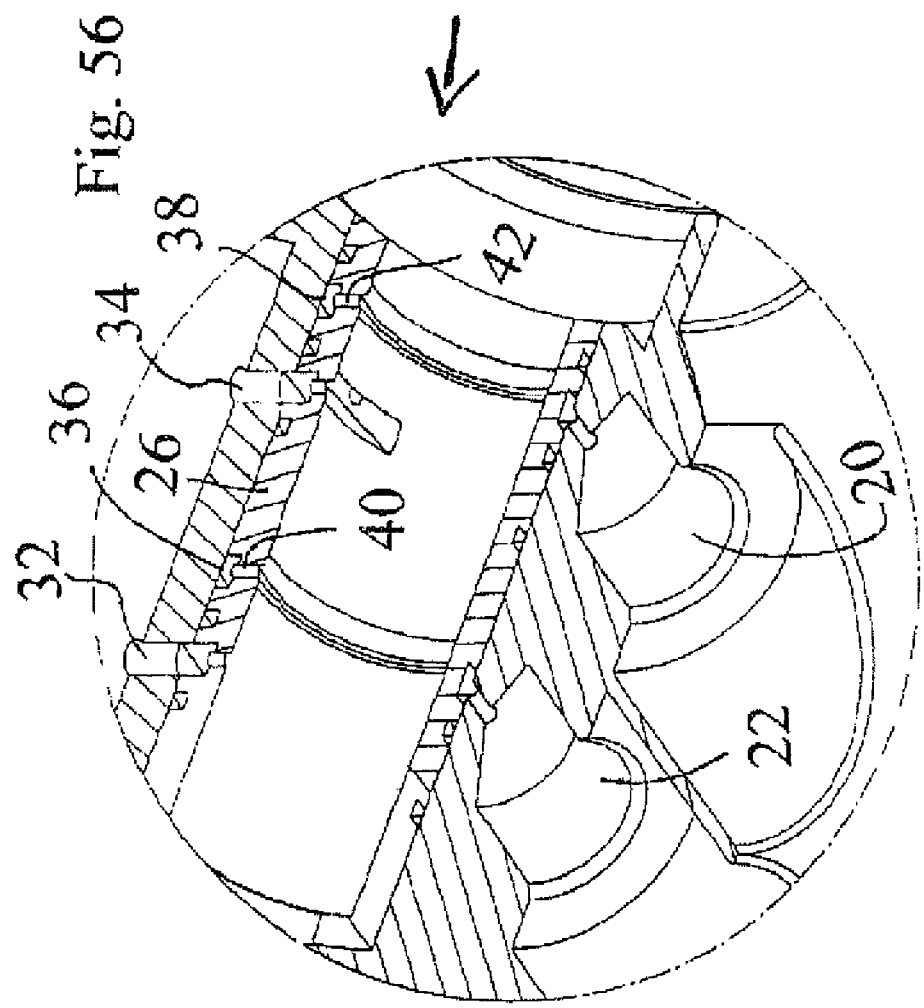
Fig. 56

AIR SPRING FOR A VEHICLE SEAT, AND VEHICLE SEAT COMPRISING SUCH AN AIR SPRING

PRIORITY CLAIM

This invention claims priority from German Patent Application No. 10 2006 059 745.1 filed Dec. 18, 2006, which is hereby incorporated by reference.

FIELD OF THE INVENTION

The present invention relates to an air spring for a vehicle seat and to a vehicle seat comprising such an air spring.

BACKGROUND OF THE INVENTION

Known air spring systems of this type usually have a control element (valve control) which is separate from the air spring and which serves to adjust the quantity of intake air and discharged air. This control system serves on the one hand the quantity of air in the air spring in order to bear the corresponding load/weight of the seat, and on the other hand to change the seat height so as to be able to adapt it individually to the body size. In the known embodiments of this type, the air-sprung driver's seat requires as an assembly an air spring, a control unit (level control unit and height control unit), at least one connecting line between the air spring and the control unit, and a supply line.

Examples of known embodiments are disclosed in DE 40 25 183 C2, DE 35 17 503 C2, DE 35 17 504 C2 or DE 35 17 505 C2 or DE 199 02 224 C1.

SUMMARY OF THE INVENTION

An object of the present invention is to provide a structurally simple and compact, cost-effective possibility for a vehicle seat suspension with the possibility of adjustment.

According to one embodiment of the present invention, there is proposed an air spring for a vehicle seat.

There is proposed in particular an air spring for a vehicle seat. The air spring comprises a plurality of air spring components which delimit at least one air spring chamber. The air spring forms an intake air connection and a discharged air connection for controlling the height and/or level of the vehicle seat.

The air spring furthermore has, for controlling the height and/or level of the vehicle seat, a valve device which is integrated in the air spring or in at least one air spring component. The air spring component in question is preferably a piston lower part or a piston upper part or a cylinder lower part or a cylinder upper part of the air spring.

A vehicle seat comprising such an air spring is also proposed. The vehicle seat may for example have a scissors-type system or scissors-type frame which may for example be designed in the manner disclosed in DE 40 25 183 C1 or DE 35 17 504 C2 or DE 35 17 505 C2 or DE 199 02 224 C1. Reference is expressly made to these documents with regard to preferred further developments of the present disclosure, wherein the corresponding passages of the disclosure are expressly included by way of reference in the subject matter of the present disclosure. The vehicle seat may be for example a tractor seat, a heavy goods vehicle or commercial vehicle seat or a seat on a bus, and namely a driver's seat in each case.

It is particularly provided that all the functions for adjusting the suspension are integrated in the piston lower part and/or in the piston upper part or in the cylinder upper part and/or cylinder lower part. This is in particular such that a module is formed.

In this case, it may be provided that this module has or includes a level control roller, a level control lever, a height adjustment control roller and a rapid lowering system.

It may be provided that the level adjustment takes place by means of a control roller, control disc or the like which is accommodated in the piston lower part and/or in the piston upper part or in the cylinder upper part and/or cylinder lower part and which, in one advantageous embodiment, opens or closes the intake air channel or discharged air channel when rotated.

A level control lever may also be provided. Such a level control lever may in this case be the connection between a scissors-type system and the level control roller. It may be provided that transmission of the force on the level control roller through the control lever takes place at a maximum speed (frequency) which is determined by an inertia element and which is much lower than the customary vibration frequencies.

A damping element or damper may also be provided. By virtue of a damping element (damper) which determines the maximum speed of rotation of the control roller, it is possible to obtain a frequency-dependent level correction, as a result of which there is no need for an "unnecessary" subsequent adjustment of the level. In one advantageous embodiment, the inertia (switching frequency) of such a damping element is below the typical operating frequencies of the system (e.g. 0.5 Hz).

In one particularly advantageous embodiment, at the same vibration (e.g. 0.5 Hz) around the level region, on account of the spring free wheel provided in one advantageous further development, a subsequent adjustment (intake air/discharged air) is not necessary, i.e. the level control device remains closed, the movement of the rocker is implemented in the free wheel alone.

It may be provided that, with longer-lasting symmetry deviations relative to the zero line (level), a damping element or the damping element allows a slow after-running of the control roller and thus releases the inlet or outlet cross section to correct the level.

It may be provided that the control roller, in the event of relatively long or permanent deviation from the zero line (level), after-runs at the maximum speed and opens the control bores for intake air or discharged air (change of driver, weight adaptation).

It may furthermore be provided that the quantity of intake air or discharged air is adapted to the incorrect position via a varying cross section in the level roller (e.g. large deviation=large cross section).

It is provided in one advantageous embodiment that, in order to change the seat height, the height adjustment control roller or a height adjustment control roller is rotated in relation to or relative to or with respect to a level roller, which leads or may lead to a perceived (desired) incorrect position of the level roller which thereafter can be corrected for example in such a way as to achieve or result in a desired height adaptation. In one advantageous embodiment, the precise height correction takes place in the dynamic range (e.g. permanent exceeding of the position in one direction).

The height adjustment control roller may be actuated for example via a Bowden cable or a different type of actuation element; resetting preferably takes place by means of a tension spring.

In one advantageous embodiment, it is possible to achieve rapid lowering. In one advantageous embodiment, the rapid lowering takes place via a second lever (button) which operates the height adjustment Bowden cable via a free wheel. By rotating the height adjustment roller (height adjustment down as far as possible), a deviation from too far up is defined and the correction takes place with a maximum flow cross section in the downward direction. It may be provided that, when triggering the rapid lowering, the level is (likewise) found as quickly as possible. In particular, it may be provided that the correction speed is slowed by the varying cross section on approaching the height adjustment position (level).

The rapid lowering could also take place via the height adjustment preset, although in this case the previous height adjustment position must be re-selected.

BRIEF DESCRIPTION OF THE DRAWINGS

Preferred and alternative embodiments of the present invention are described in detail below with reference to the following drawings:

FIGS. 3-6 show different views of the piston lower part or cylinder lower part of the embodiments shown in FIGS. 1 and 2;

FIGS. 7-12 show different views of the height control roller or of the height adjustment module of the embodiments shown in FIGS. 1 and 2;

FIGS. 13-24 show different views of the level control roller or level control device of the embodiments shown in FIGS. 1 and 2;

FIGS. 33-37 show different views of the tappet of the embodiment shown in FIG. 1;

FIGS. 38-43 show different views of the valve lever of the embodiment shown in FIG. 1;

FIGS. 50-56 show different positions of the embodiment shown in FIG. 1 and in FIG. 2, in each case as a view in partial section and as an enlarged detail from the respective view in partial section;

DETAILED DESCRIPTION OF THE PREFERRED EMBODIMENT

Figure 1:
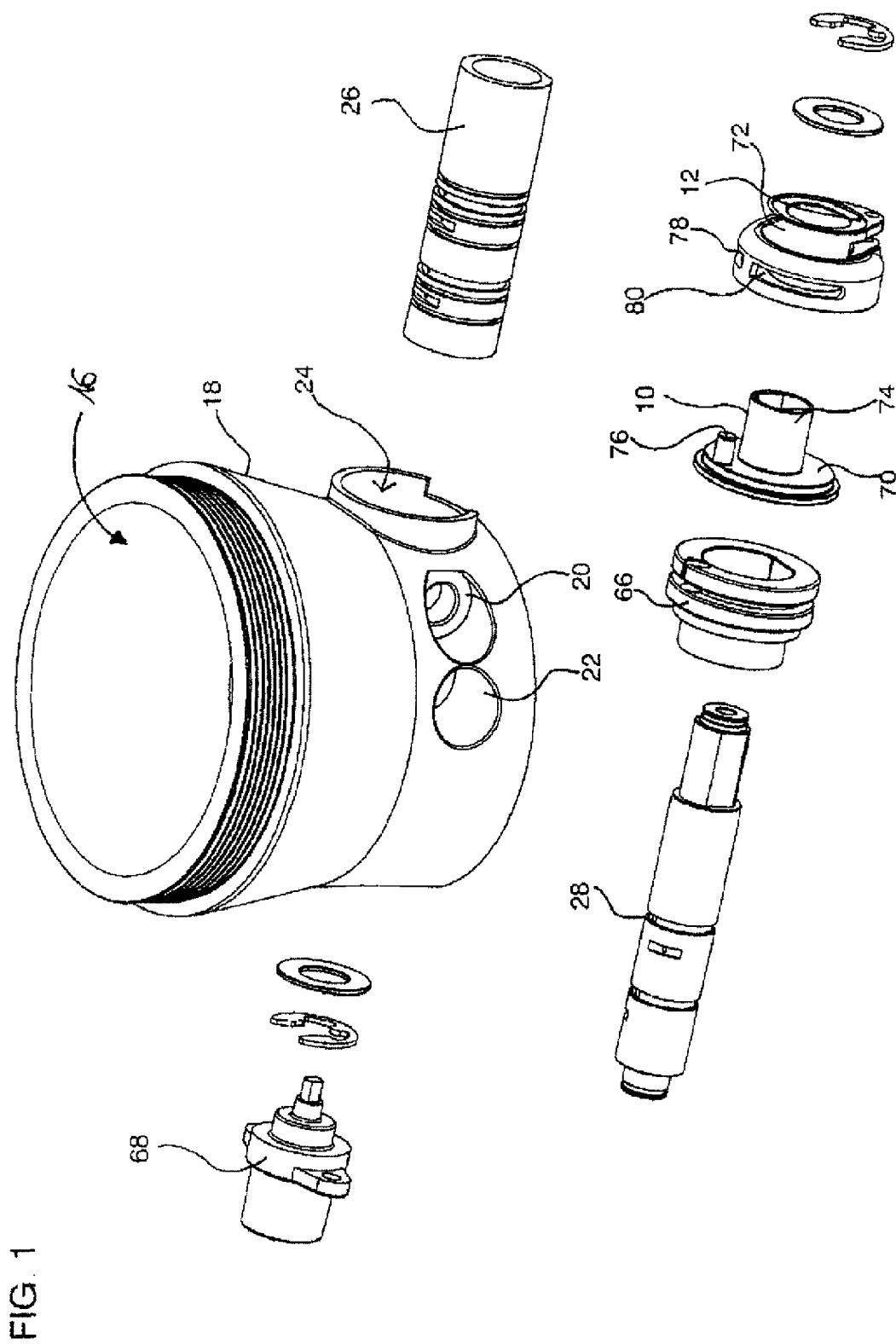
FIG. 1 shows a first example of embodiment according to the invention in a partial, schematic exploded view.

FIG. 1 shows, in a partial, schematic exploded view, a first example of an air spring according to the invention for springing and adjusting, in particular controlling the height and/or level of, air-sprung vehicle seats, wherein the embodiment shown in FIG. 1 has an integrated free wheel.

Figure 2:
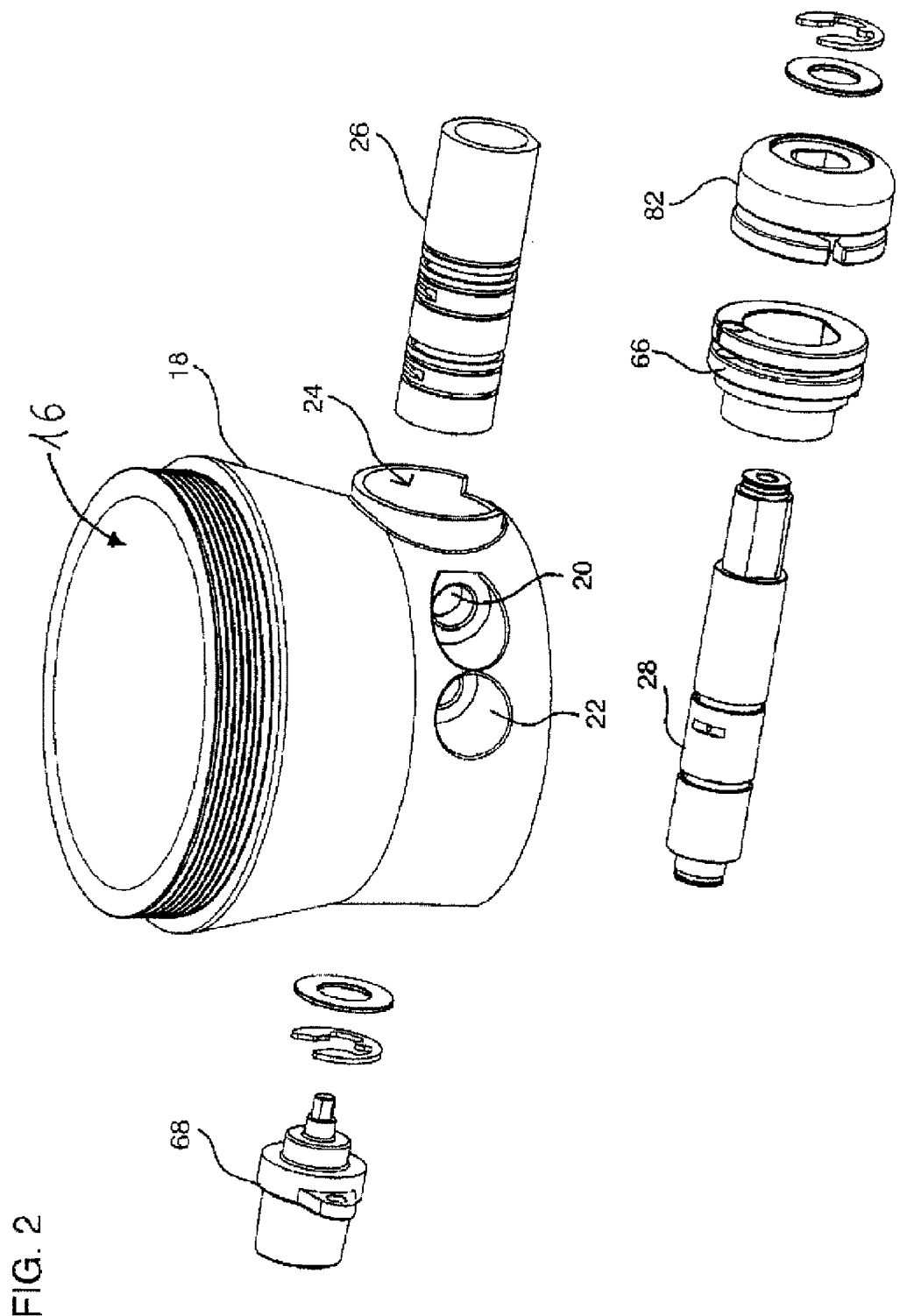
FIG. 2 shows a second example of embodiment according to the invention in a partial, schematic exploded view.
Figure 23:
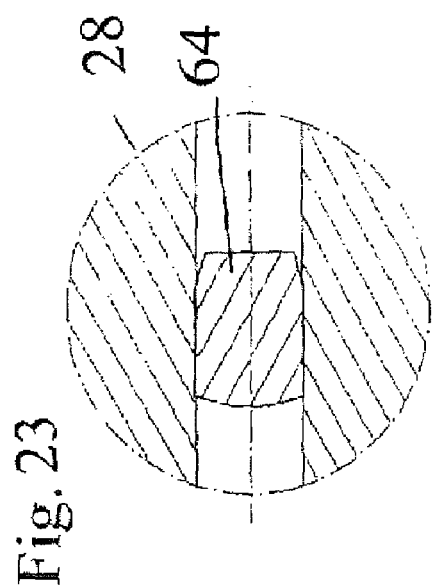
Figure 21:
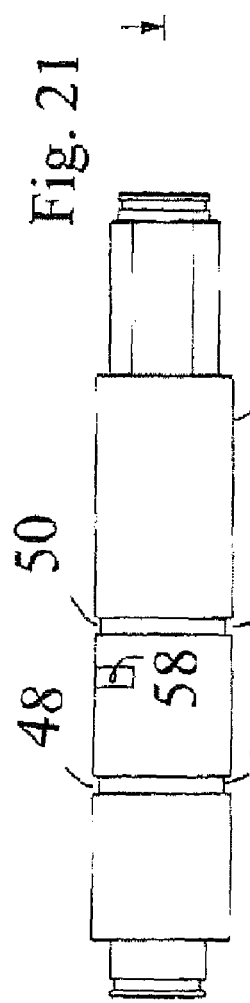
Figure 22:
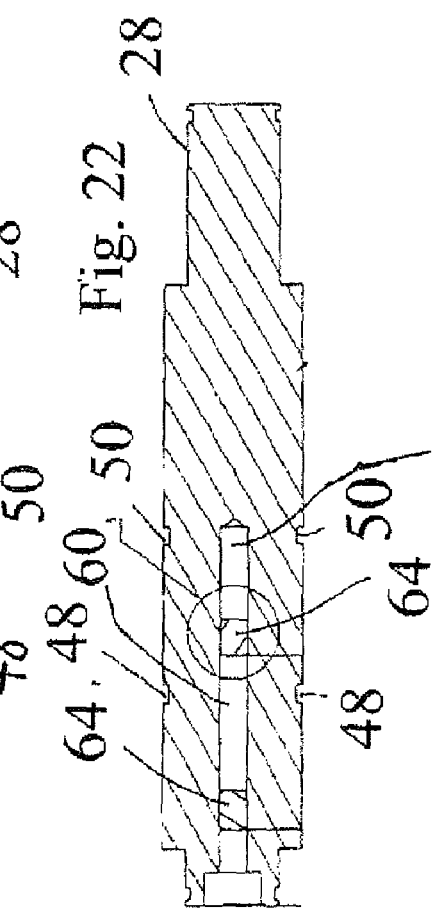
Figure 24:
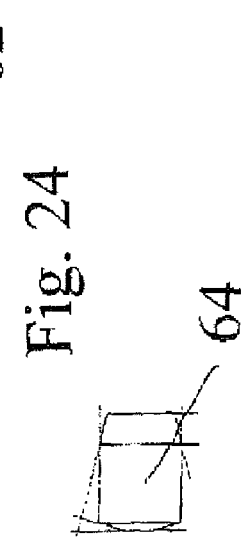
Figure 27:
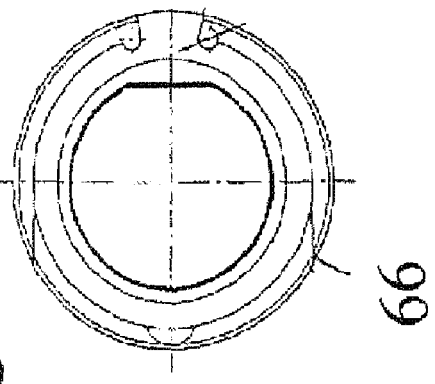
FIGS. 25-29 show different views of the height adjustment lever of the embodiments shown in FIGS. 1 and 2.
Figure 29:
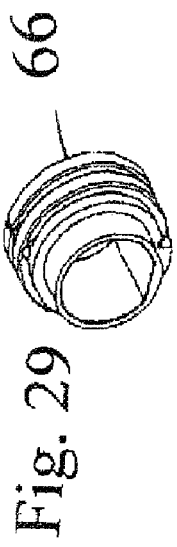
Figure 26:
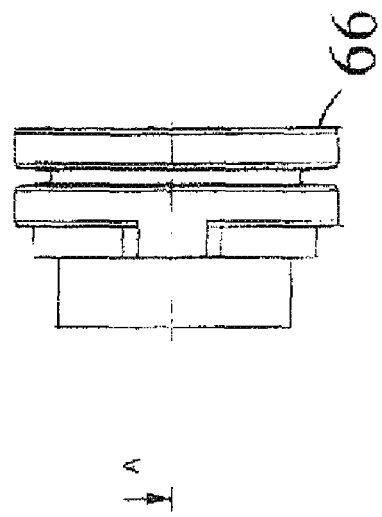
Figure 25:
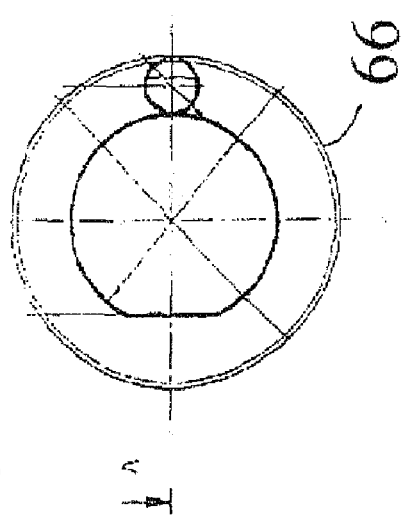
Figure 28:
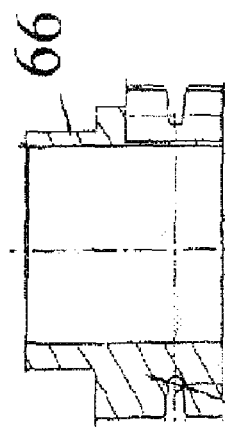

FIG. 2 shows, in a partial, schematic exploded view, a second example of an air spring according to the invention for springing and adjusting, in particular controlling the height and/or level of, air-sprung vehicle seats, wherein the adjustment device shown in FIG. 2 has an external free wheel.

The air springs shown in FIGS. 1 and 2 therefore differ in particular in that a tappet 10 and a valve lever 12 and also a rotary spring (not shown) are provided in the air spring shown in FIG. 1, whereas a drive wheel 14 is provided instead in the embodiment shown in FIG. 2.

Apart from this, the embodiments shown in FIGS. 1 and 2 do not substantially differ from one another, and so the description is given jointly for both embodiments together.

The air springs shown in FIGS. 1 and 2 include a plurality of air spring components for delimiting an air spring chamber 16 which can be filled with air, of which one air spring component 18, which is designed as a piston lower part or cylinder lower part, is shown in FIGS. 1 and 2.

The air spring component 18, which is shown as an individual part in different views in FIGS. 3 to 6, has an intake air connection 20 and a discharged air connection 22 for controlling the amount of air in the piston thereby controlling the height and/or level of the vehicle seat. The intake air connection 20 extends parallel to the discharged air connection 22. Transversely to the intake air connection 20 and the discharged air connection 22, the air spring component 18 has a through-channel 24, into which the intake air connection 20 and the discharged air connection 22 open.

In the assembled state, a height adjustment module or a height control roller 26 and a level control device or level control roller 28 extend through or inside the through-channel 24. The height adjustment module or height control roller 26 is of hollow-cylindrical shape, so that a through-channel is formed inside the height adjustment module or height control roller 26, in which through-channel the level control device or level control roller 28 is rotatably accommodated.

The height control roller or height adjustment module 26 is shown as an individual part in various views in FIGS. 7 to 12, and the level control roller or level control device 28 is shown in different views in FIGS. 13 to 24.

Two through-openings 32, 34 are provided in an axially offset manner—relative to the longitudinal axis of the through-channel 24—in the bottom 30 of the air spring component or piston lower part or cylinder lower part 18. These two through-openings, which for ease of reference are also referred to as the first through-opening 32 and second through-opening 34—extend from the interior of the air-spring chamber 16 provided for accommodating the spring air volume to the through-channel 24 (FIG. 50).

The first through-opening 32 is provided for the outflow of air from the air spring chamber 16, and the second through-opening 34 is provided for the filling or inflow of air into the air spring chamber 16.

The height adjustment module or height control roller 26 has in its outer surface a first annular channel 36 for discharged air and a second annular channel 38 for intake air. At least a third through-opening 40 is provided in the bottom of the first annular channel 36, and at least a fourth through-opening 42 is provided in the bottom of the second annular channel 38.

A fifth through-opening 44 extends radially through the height adjustment module or height control roller 26 in an axially offset manner (with respect to the axial direction of the height adjustment module or height control roller 26 and of the level control device or level control roller 28) relative to the first annular channel 36 with the third through-opening 40, and widens for example—such as radially outwards here—in the axial direction and in the circumferential direction (e.g. ±27.5°). Like the third through-opening 40, this fifth through-opening 44 is provided for discharged air.

A sixth through-opening 46 extends radially through the height adjustment module or height control roller 26 in an axially offset manner (with respect to the axial direction of the height adjustment module or height control roller 26 and of the level control device or level control roller 28) relative to the second annular channel 38 with the fourth through-opening 42, and widens for example—such as radially outwards here—in the axial direction and in the circumferential direction (e.g. ±27.5°). Like the fourth through-opening 42, this sixth through-opening 44 is provided for intake air.

The level control device or level control roller 28 is of hollow or hollow-cylindrical shape. The level control device or level control roller 28 has in its outer surface a third annular channel 48 for discharged air and, in particular in an axially offset manner thereto, a fourth annular channel 50 for intake air. From the third annular channel 48 a seventh through-opening 52 extends into the radial interior of the level control device or level control roller 28, and from the fourth annular channel 50 an eighth through-opening 54 extends into the radial interior of the level control device or level control roller 28.

A ninth through-opening 56 extends radially through the level control device or level control roller 28 in an axially offset manner (with respect to the axial direction of the height adjustment module or height control roller 26 and of the level control device or level control roller 28) relative to the third annular channel 48 with the seventh through-opening 52, and widens for example—such as radially outwards here—in the axial direction and in the circumferential direction. Like the seventh through-opening 52, this ninth through-opening 56 is provided for discharged air.

A tenth through-opening 58 extends radially through the level control device or level control roller 28 in an axially offset manner (with respect to the axial direction of the height adjustment module or height control roller 26 and of the level control device or level control roller 28) relative to the fourth annular channel 50 with the eighth through-opening 54, and widens for example—such as radially outwards here—in the axial direction and in the circumferential direction. Like the eighth through-opening 54, this tenth through-opening 58 is provided for intake air.

The height adjustment module or height adjustment roller 26 can be rotated relative to the air spring component or piston lower part or cylinder lower part 18 and relative to the level control device or level control roller 28. The level control device or level control roller 28 can be rotated relative to the air spring component or piston lower part or cylinder lower part 18.

With respect to the axial direction of the height adjustment module or height control roller 26 and of the level control device or level control roller 28, the first through-opening 32, the fifth through-opening 44 and the ninth through-opening 56 are at one level in the axial direction so that—at corresponding rotation positions of the height adjustment module or height control roller 26 and of the level control device or level control roller 28—they are flow-connected.

With respect to the axial direction of the height adjustment module or height control roller 26 and of the level control device or level control roller 28, the first annular channel 36, the third through-opening 40, the third annular channel 48 and the seventh through-opening 52 are at one level in the axial direction so that they are flow-connected.

With respect to the axial direction of the height adjustment module or height control roller 26 and of the level control device or level control roller 28, the second through-opening 34, the sixth through-opening 46 and the tenth through-opening 58 are at one level in the axial direction so that—at corresponding rotation positions of the height adjustment module or height control roller 26 and of the level control device or level control roller 28—they are flow-connected.

With respect to the axial direction of the height adjustment module or height control roller 26 and of the level control device or level control roller 28, the second annular channel 38, the fourth through-opening 42, the fourth annular channel 50 and the eighth through-opening 54 are at one level in the axial direction so that they are flow-connected.

The intake air connection 20 opens into the second annular channel 38. The discharged air connection 22 opens into the first annular channel 36.

In the interior of the level control device or level control roller 28, the seventh through-opening 52 and the ninth through-opening 56 are flow-connected via a discharged air chamber 60. Furthermore, in the interior of the level control device or level control roller 28, the eighth through-opening 54 and the tenth through-opening 58 are flow-connected via an intake air chamber 62.

Stoppers 64 are introduced in order to form the chambers 60, 62.

In the embodiments shown in FIGS. 1 and 2, a height adjustment lever 66 is also provided. This height adjustment lever 66 is connected to the level control device or level control roller 28 so as to rotate therewith. The height adjustment lever 66 can be actuated in a rotating or pivoting manner, namely for example by means of a Bowden cable. FIGS. 25 to 29 show different views of the height adjustment lever.

Figure 31:
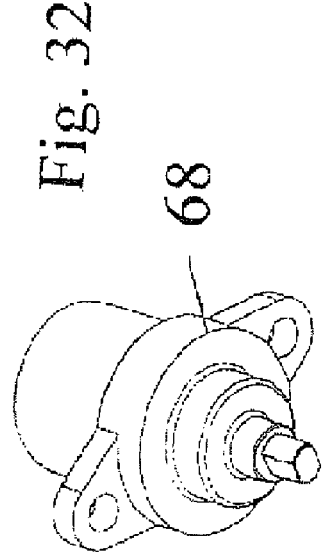
FIGS. 30-32 show different views of the damper or frequency regulator of the embodiments shown in FIGS. 1 and 2.
Figure 32:
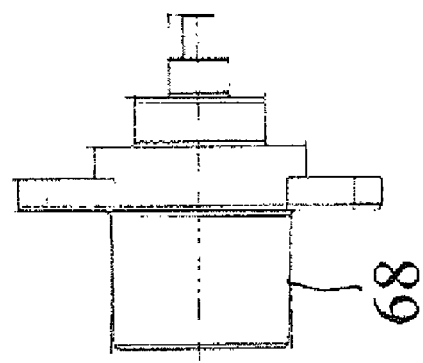
Figure 30:
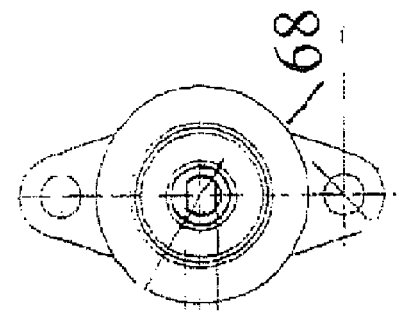
Figure 44:
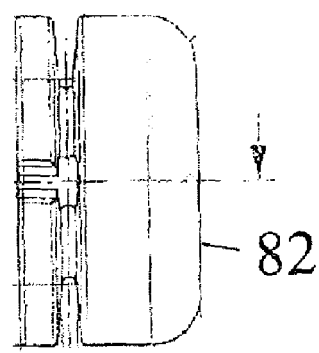
FIGS. 44-47 show different views of the drive wheel of the embodiment shown in FIG. 2.
Figure 45:
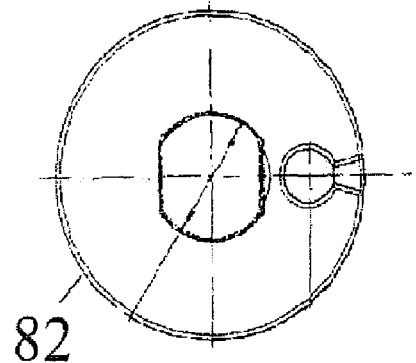
Figure 46:
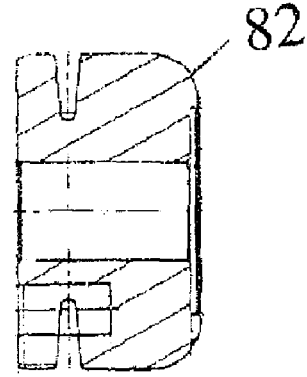
Figure 47:
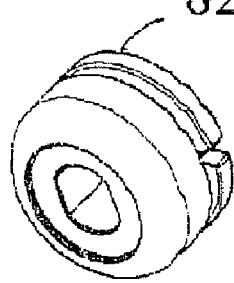
Figure 49:
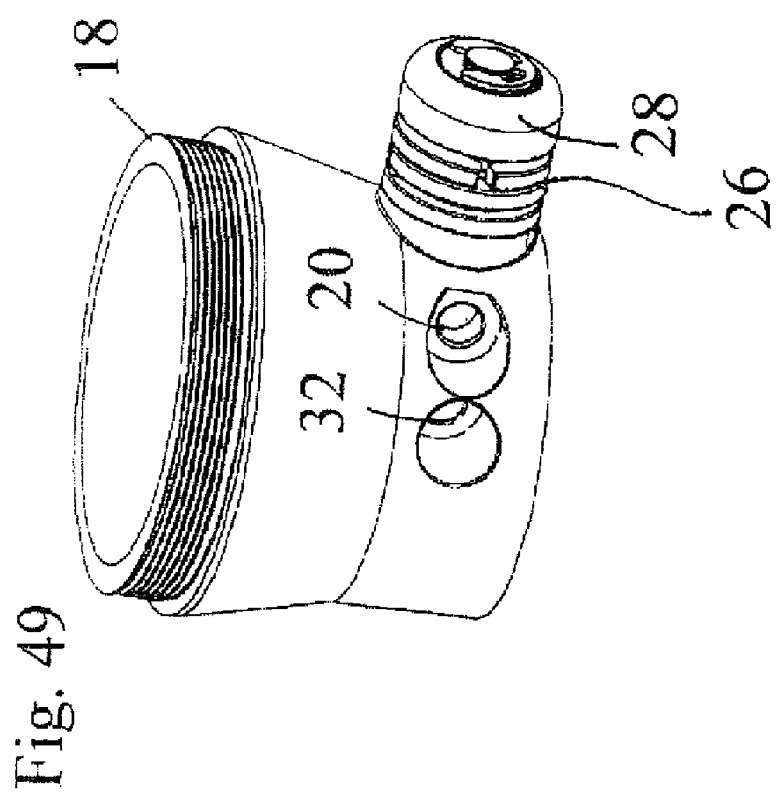
FIGS. 48-49 show 3D views of the embodiment shown in FIG. 1 and FIG. 2, respectively.
Figure 48:
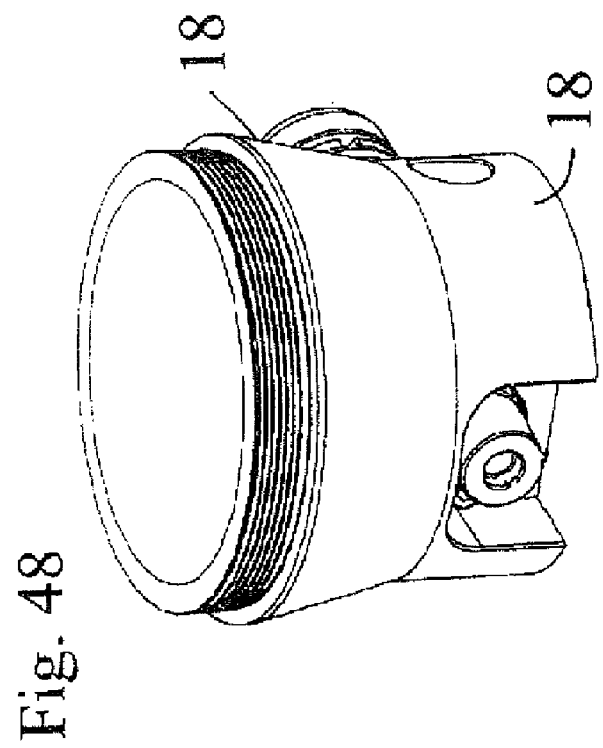

In the embodiments shown in FIGS. 1 and 2, a damper or frequency regulator 68 is also provided, which is coupled to the level control device or level control roller 28. Different views of this damper or frequency regulator 68 are shown in FIGS. 30 to 32.

In the embodiment shown in FIG. 1, a tappet 70 and a valve lever 72 are also provided. The tappet 70 is inserted in the valve lever 12 by its central protrusion 74. The tappet 70 furthermore forms an eccentrically arranged axial protrusion 76 for cooperation with a leg spring (not shown) and a web 78 which will be discussed below.

The valve lever has in its outer surface a slot 80 extending in the circumferential direction, which slot is interrupted by the aforementioned web 78.

The leg spring (not shown) extends around the central protrusion 74, wherein its legs engage behind both the axial protrusion 76 and the web 78 in such a way that, when a torque is applied in order to rotate the valve lever 72 relative to the tappet 70, the spring is loaded, namely regardless of the direction of rotation of the torque.

Different views of the tappet 70 are shown in FIGS. 33 to 37. Different views of the valve lever 72 are shown in FIGS. 38 to 43.

In the embodiment, a drive wheel 82 is provided. Instead of the spring, which is not shown in FIG. 1 but is provided therein, in FIG. 2 a Bowden cable may be provided which engages in the drive wheel. Different views of the drive wheel 82 are shown in FIGS. 44 to 47.

It is formed in particular by a valve, the positions of which can be set in particular by rotating the height adjustment module or height control roller 26 and the level control device or level control roller 28.

FIGS. 50 to 56 show different positions of the embodiment shown in FIG. 1 and FIG. 2, in each case showing a sectional view and an enlarged detail from this respective sectional view.

Figure 52:
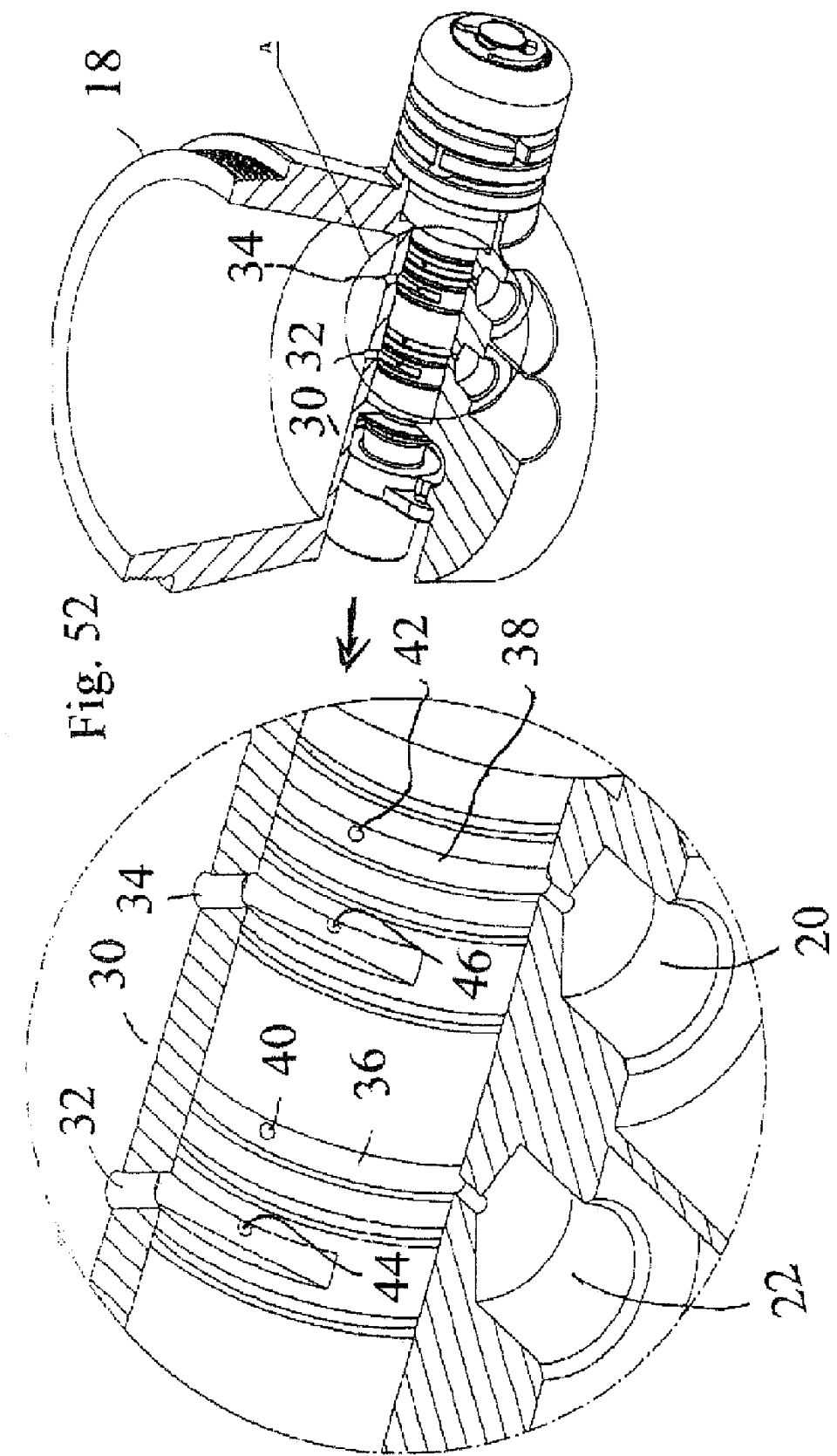

FIG. 50 shows the position "height adjustment bottom"; FIG. 51 shows the position "height adjustment middle"; FIG. 52 shows the position "height adjustment top".

Figure 55:
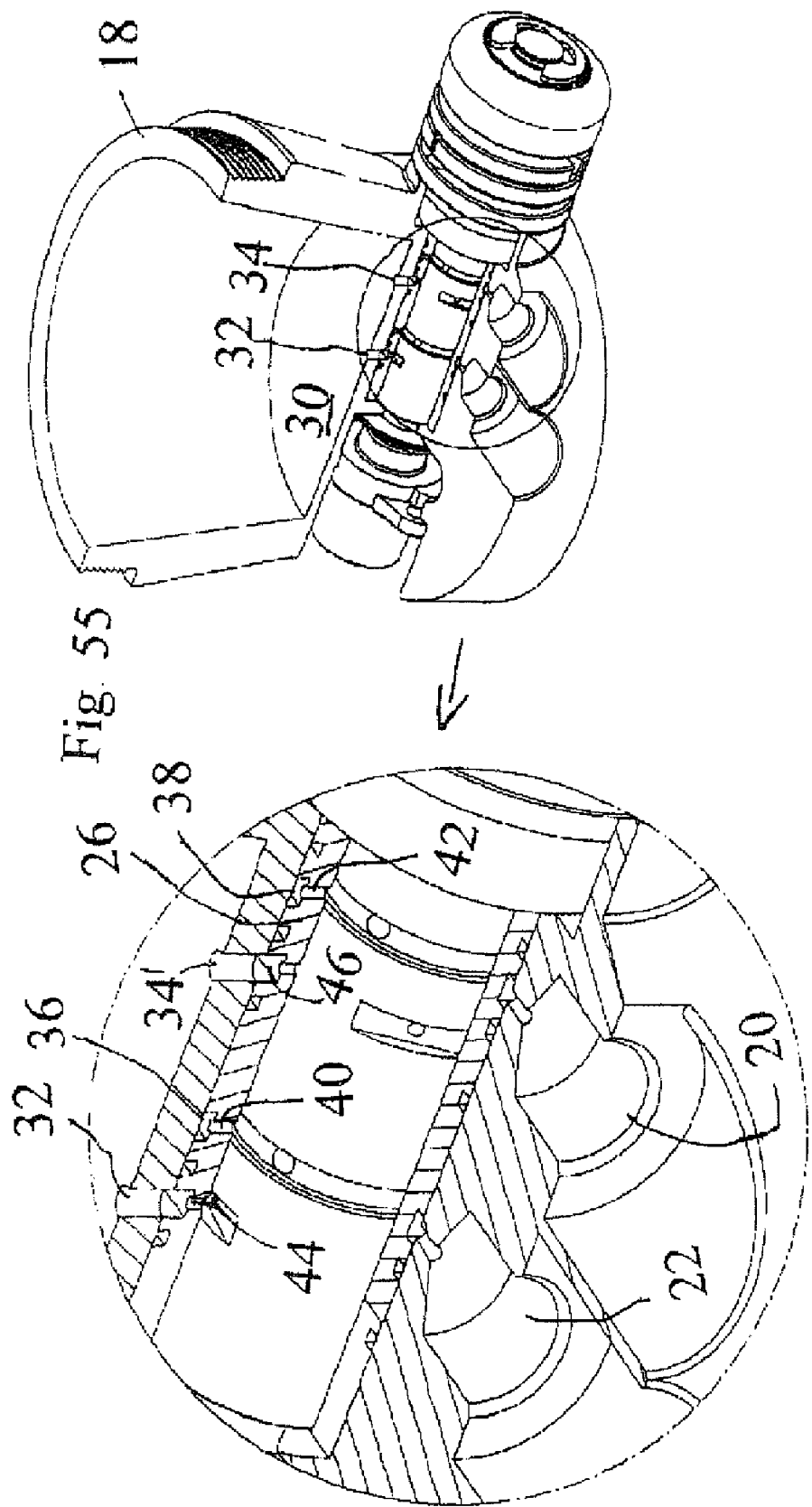

FIG. 53 shows the position "level OK" (closed); FIG. 54 shows the position "fine/height adjustment middle"; FIG. 55 shows the position "level too high" (discharge air opened); and FIG. 56 shows the position "level too low" (intake air opened).

Figure 57:
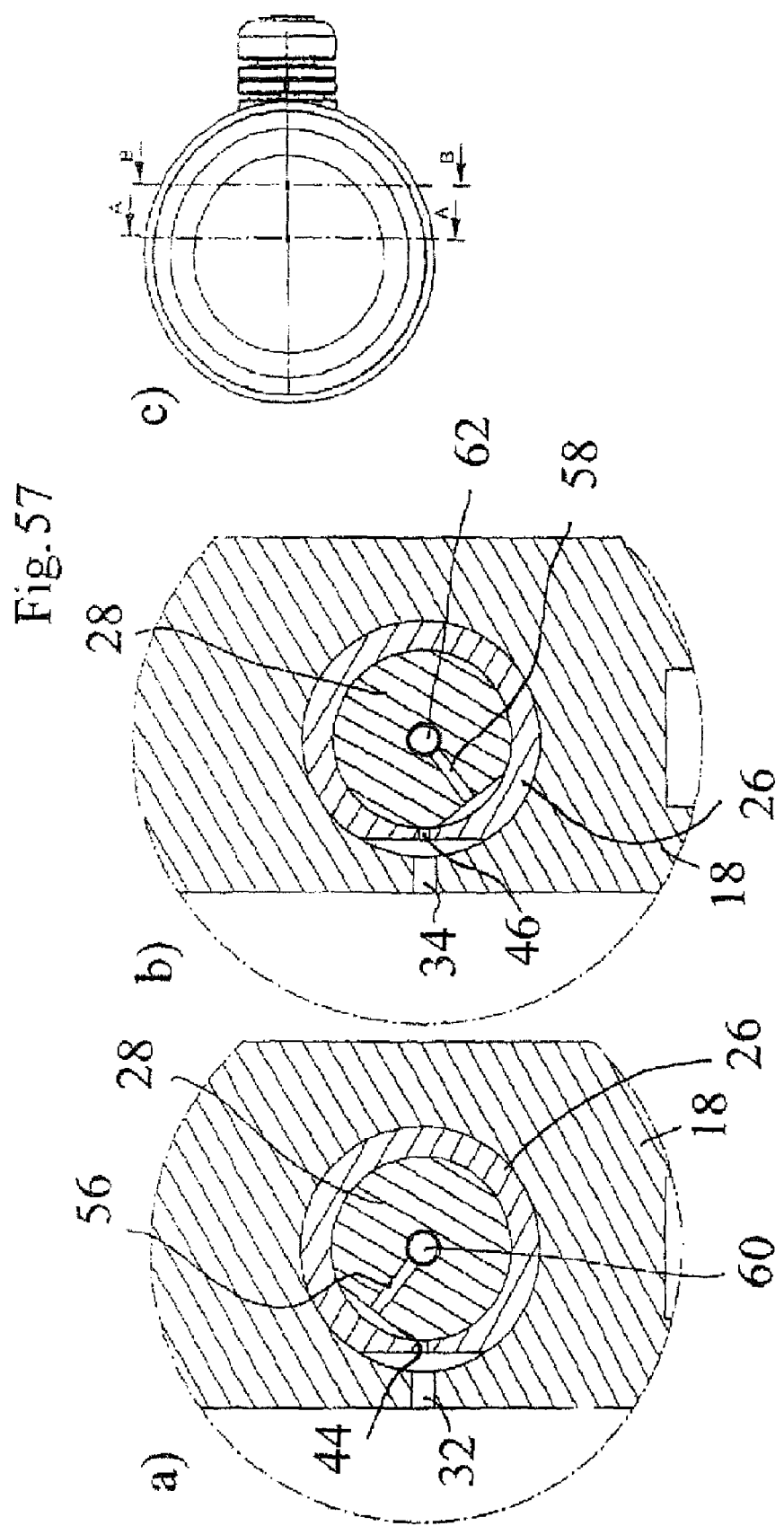
FIG. 57 *a*)-*c*) show a further view of the embodiment according to the invention with two cross sections which illustrate a position of the embodiment according to the invention.

FIG. 57 a)-c) shows a further view of the embodiment according to the invention with two cross sections which illustrate a position of the embodiment according to the invention.

Figure 58:
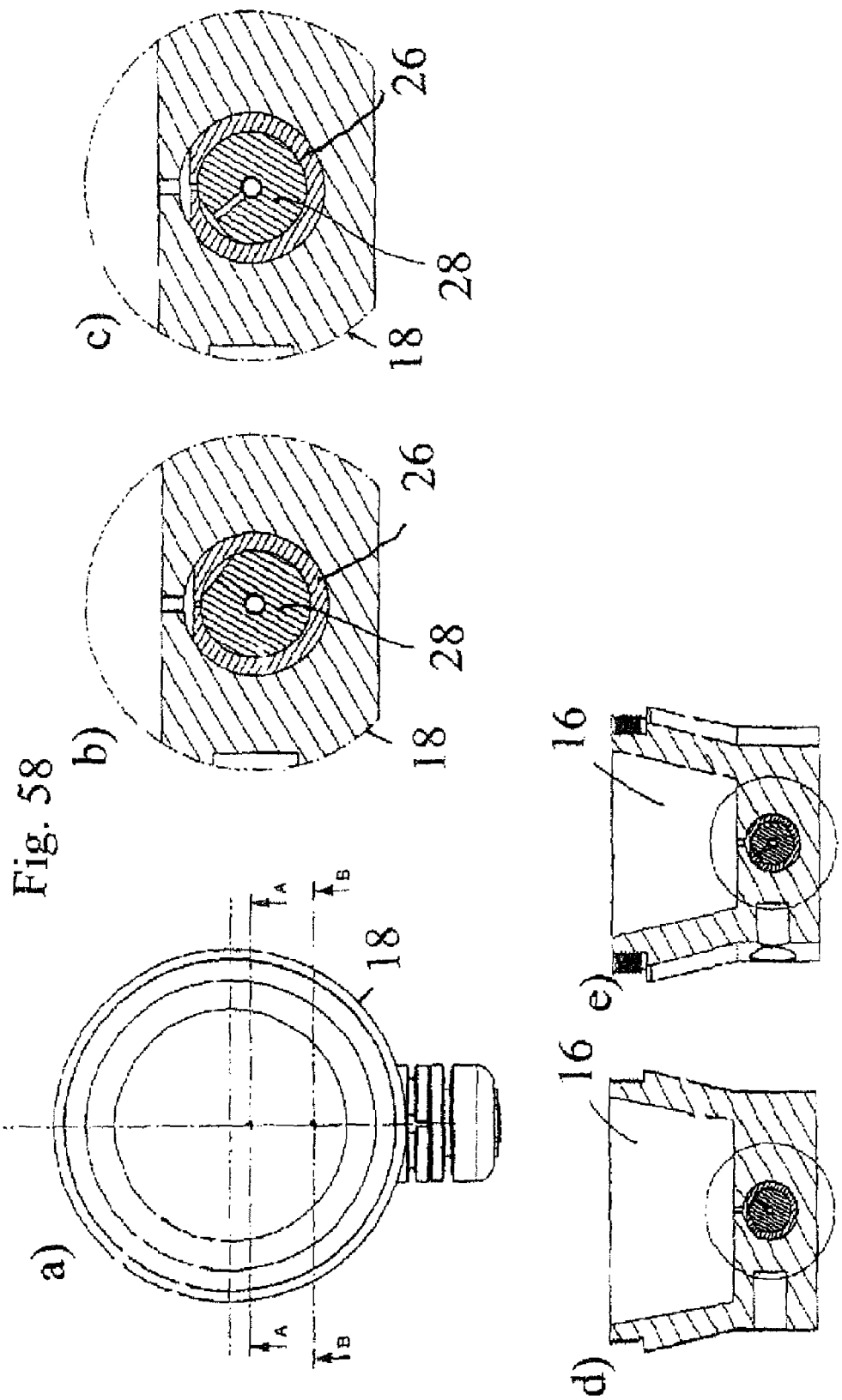
FIG. 58 *a*)-*e*), FIG. 59 *a*)-*e*), FIG. 60 *a*)-*e*), FIG. 61 *a*)-*e*) and FIG. 62 *a*)-*e*) show different positions of the embodiment shown in FIG. 1 and in FIG. 2, in each case in five views.
Figure 59:
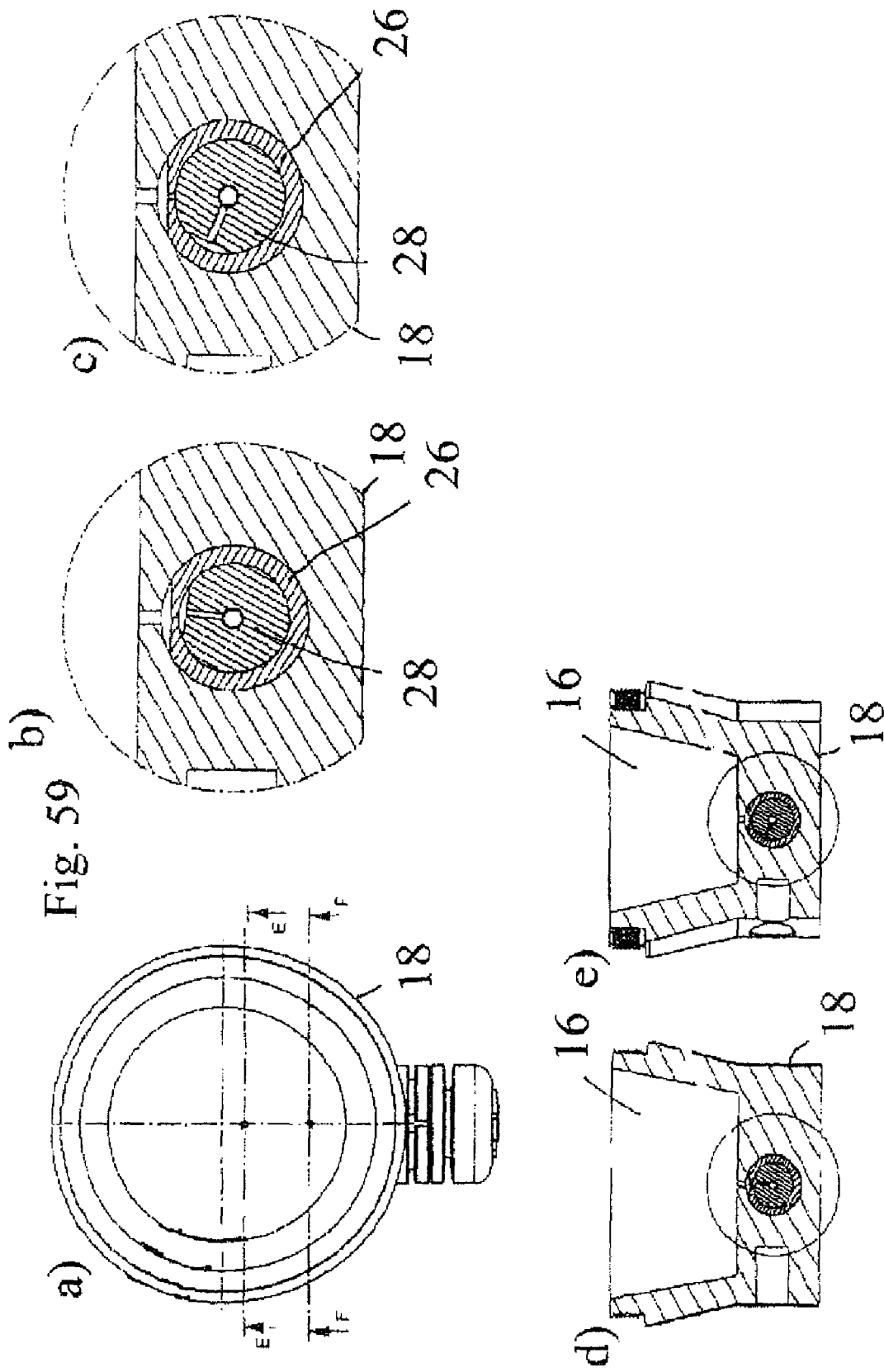
Figure 60:
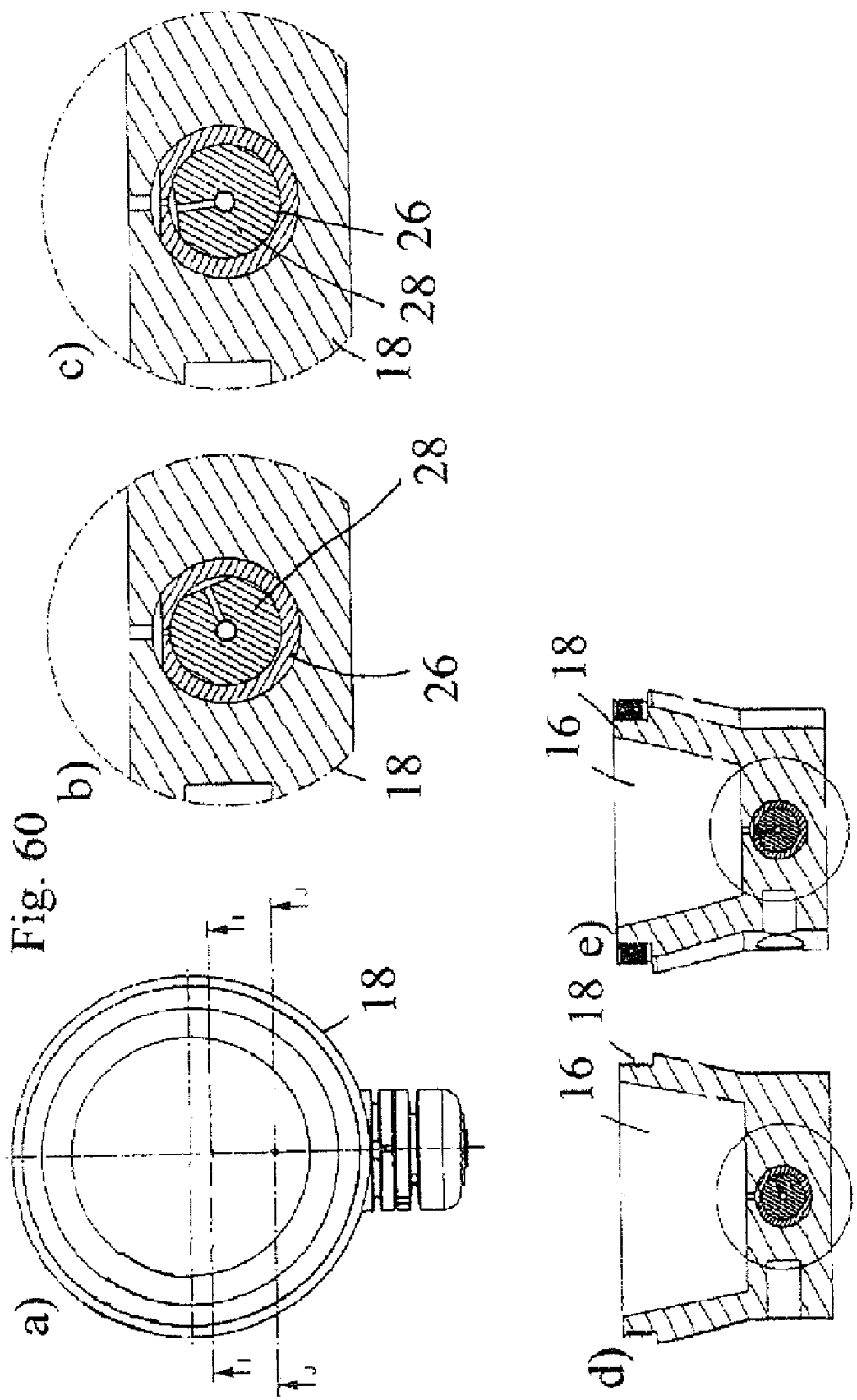
Figure 61:
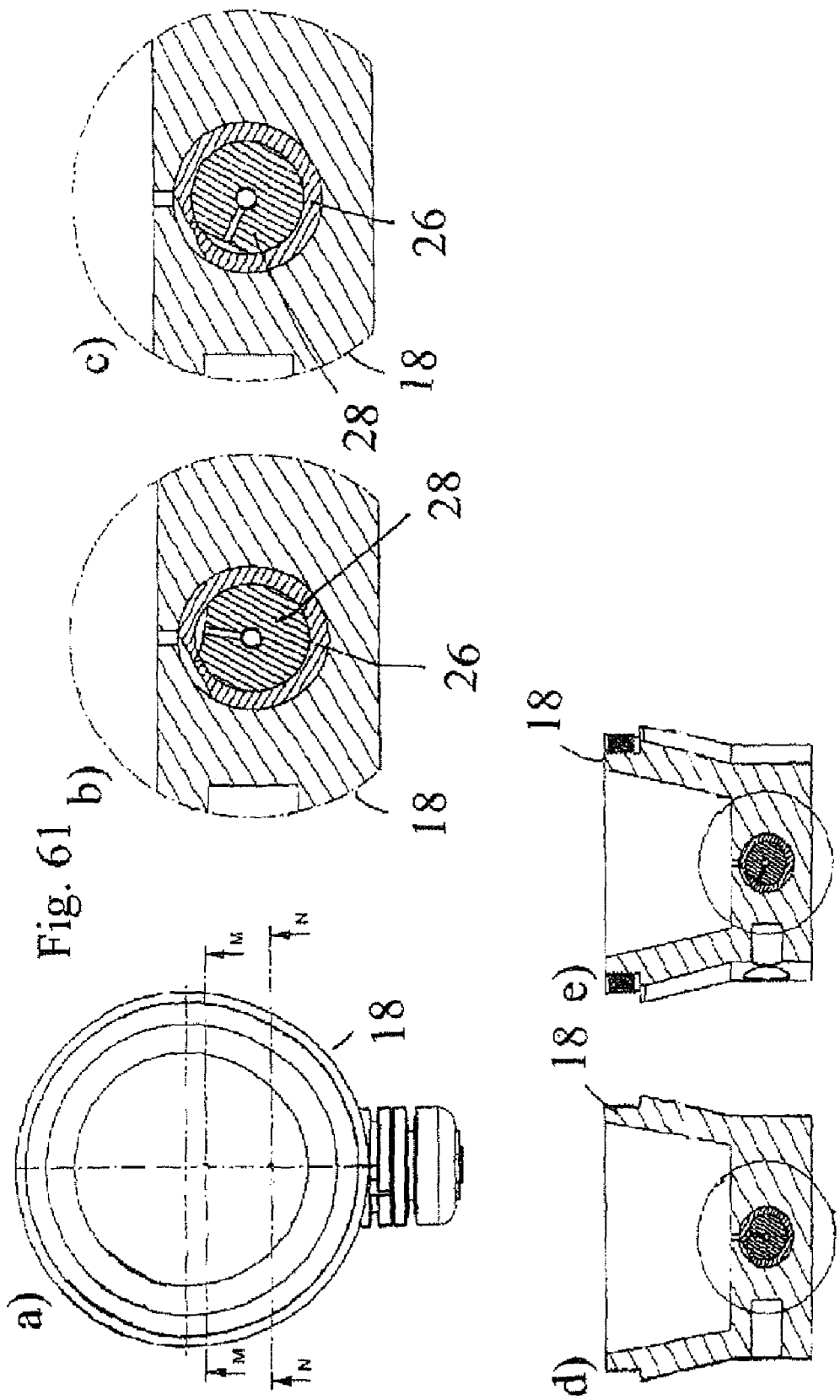
Figure 62:
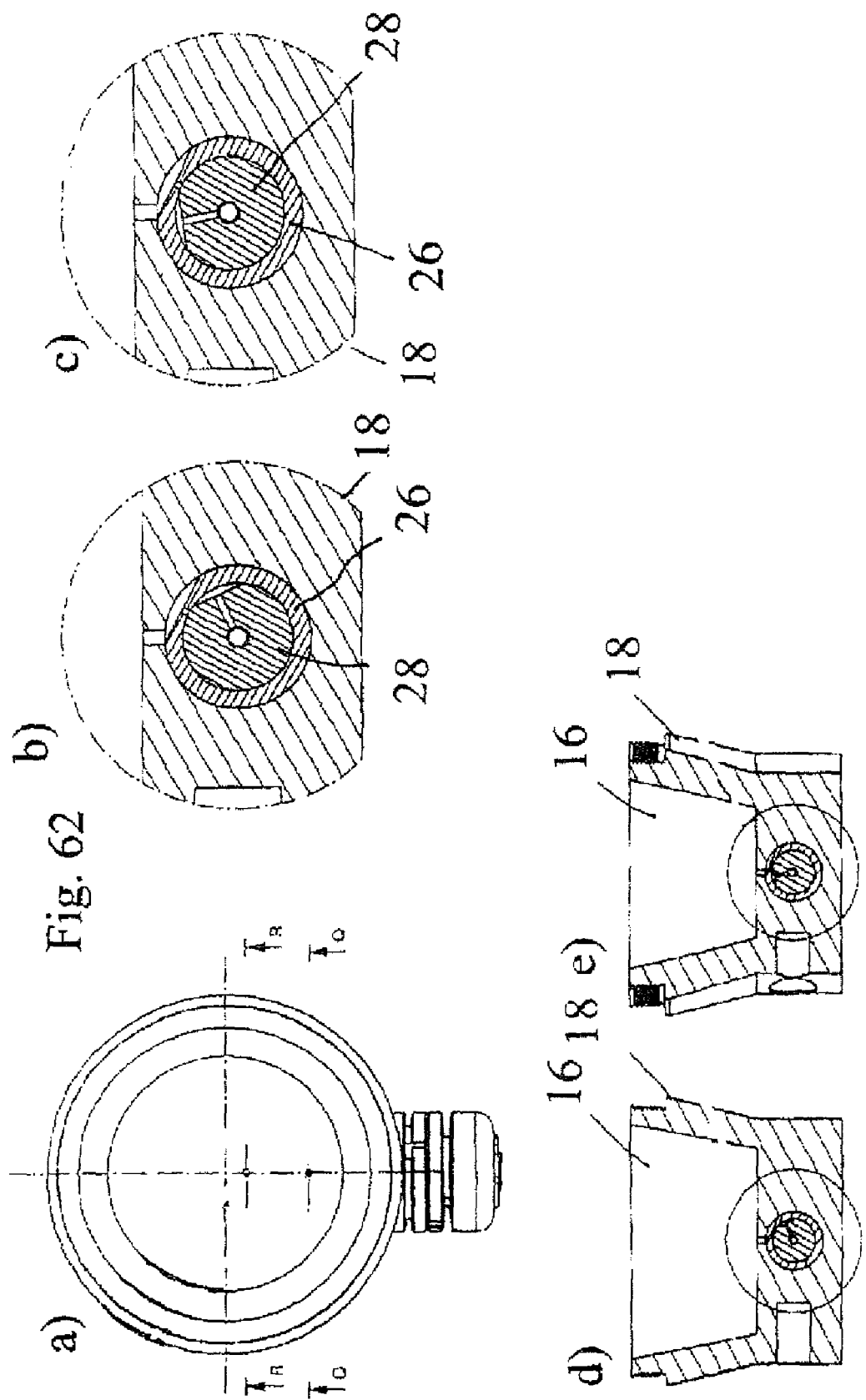

FIG. 58 a)-e), FIG. 59 a)-e), FIG. 60 a)-e), FIG. 61 a)-e) and FIG. 62 a)-e) show different positions of the embodiment shown in FIG. 1 and in FIG. 2.

FIG. 58 a)-e) shows a position in which the height adjustment is at its "middle" position, the level is neutral, and accordingly the intake air is closed and the discharge air is closed.

FIG. 59 a)-e) shows a position in which the height adjustment is at its "middle" position, the level is too low, and accordingly the intake air is opened and the discharge air is closed.

FIG. 60 a)-e) shows a position in which the height adjustment is at its "middle" position, the level is too high, and accordingly the intake air is closed and the discharge air is opened.

FIG. 61 a)-e) shows a position in which the height adjustment is at its "bottom" position, the level is neutral, and accordingly the intake air is closed and the discharge air is closed.

FIG. 62 a)-e) shows a position in which the height adjustment is at its "top" position, the level is neutral, and accordingly the intake air is closed and the discharge air is closed.

The free wheels may also be formed by means of tension springs.

Like the examples of embodiments in particular, the invention reduces the assemblies mentioned in the introduction (which were four in number) to two assemblies, namely the air spring with the integrated control unit (level control unit and height control unit) and the supply line (power supply network).

Here, the complete control unit consisting of the height adjustment system and the level control device is integrated in the air spring piston.

Like in other known systems, the actuation of the level control unit takes place through a direct connection, such as e.g. a push rod, a gear rack or the like, of the rocker/scissors.

The control system is triggered by the vertical movement of the suspension (the guide system) in the driver's seat, in this case illustrated as an X-shaped scissors-type system.

The height adjustment of the suspension system is performed via the rotation of the height control roller, which is connected by a Bowden cable or the like to a handwheel for example.

The level control roller is additionally equipped with a frequency regulator so as to suppress, from a frequency of approx. >0.5 Hz, permanent adjustment by supplying and discharging air.

The scales and dimensions shown in the figures are given purely by way of example and can also be selected differently. The Applicant reserves the right to modify the figures in such a way as to remove all or some of these details. However, the Applicant also reserves the right to formulate claims taking account of one or more of the dimensions and/or ratios that can be seen in the figures.

All the features disclosed in the application documents are claimed as essential to the invention in so far as they are novel individually or in combination with one another with respect to the prior art.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

LIST OF REFERENCES 1 air spring
10 tappet
12 valve lever
14 drive wheel
16 air spring chamber
18 air spring component or piston lower part or cylinder lower part
20 intake air connection
22 discharged air connection
24 through-channel
26 height adjustment module or height control roller
28 level control device or level control roller
30 bottom of 18
32 first through-opening in 18
34 second through-opening in 18
36 first annular channel in 26 for discharged air in 26
38 second annular channel in 26 for intake air in 26
40 third through-opening in 26
42 fourth through-opening in 26
44 fifth through-opening in 26
46 sixth through-opening in 26
48 third annular channel in 28
50 fourth annular channel in 28
52 seventh through-opening in 28
54 eighth through-opening in 28
56 ninth through-opening in 28
58 tenth through-opening in 28
60 discharged air chamber
62 intake air chamber
64 stopper
66 height adjustment lever
68 damper or frequency regulator
70 tappet
72 valve lever
74 central protrusion of 70
76 axial protrusion of 70
78 web of 72
80 slot in 72
82 drive wheel The embodiments of the invention in which an exclusive property or privilege is claimed are defined as follows:

1. An air spring for a vehicle seat, the air spring comprising:
   a plurality of air spring components configured to delimit at least one air spring chamber;
   an intake air connection;
   a discharged air connection for air flow into a piston chamber, thereby controlling one of the height or level of the vehicle seat; and
   a valve device integrated in one of the air spring or the plurality of air spring components for controlling one of the height or level of the vehicle seat,
   wherein the air spring component forms a through-channel, in which a height control roller extends.

2. The air spring according to claim 1, wherein the height control roller is a hollow cylinder, further comprising a level control roller configured to extend inside the height control roller.

3. The air spring according to claim 1, wherein the through-channel extends transversely, perpendicular to the central axis of one of the intake air connection or the discharged air connection.

4. The air spring according to claim 2, wherein the through-channel extends transversely, perpendicular to the central axis of one of the intake air connection or the discharged air connection.

5. The air spring according to claim 3, further comprising a free wheel integrated with the valve device.

6. The air spring according to claim 4, further comprising a free wheel integrated with the valve device.

7. The air spring according to claim 5, further comprising a housing, wherein the free wheel is external to the housing.

8. The air spring according to claim 6, further comprising a housing, wherein the free wheel is external to the housing.

9. A vehicle seat with a sitting area, the seat comprising:
an air spring comprising:
- a plurality of air spring components configured to delimit at least one air spring chamber;
- an intake air connection;
- a discharged air connection for controlling one of the height or level of the vehicle seat; and
- a valve device integrated in one of the air spring or the plurality of air spring components for controlling one of the height or level of the vehicle seat,
wherein the air spring component forms a through-channel, in which a height control roller extends.

* * * * *